(12) United States Patent
Yokokawa et al.

(10) Patent No.: US 9,645,467 B2
(45) Date of Patent: *May 9, 2017

(54) ELECTROPHORETIC PARTICLES, ELECTROPHORETIC DISPERSION LIQUID, DISPLAY SHEET, DISPLAY DEVICE, AND ELECTRONIC EQUIPMENT

(71) Applicant: SEIKO EPSON CORPORATION, Tokyo (JP)

(72) Inventors: Shinobu Yokokawa, Okaya (JP); Masahiko Nakazawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 14/299,828

(22) Filed: Jun. 9, 2014

(65) Prior Publication Data

US 2014/0376081 A1 Dec. 25, 2014

(30) Foreign Application Priority Data

Jun. 24, 2013 (JP) .................................. 2013-131987
Feb. 18, 2014 (JP) .................................. 2014-029023

(51) Int. Cl.
| C09K 9/00 | (2006.01) |
| G02F 1/00 | (2006.01) |
| G02F 1/167 | (2006.01) |
| G03G 17/04 | (2006.01) |

(52) U.S. Cl.
CPC ...... *G02F 1/167* (2013.01); *G02F 2001/1678* (2013.01)

(58) Field of Classification Search
USPC ............... 204/450; 252/500, 519.33, 583; 359/296, 290; 428/402.2; 430/32; 526/279

See application file for complete search history.

(56) References Cited

U.S. PATENT DOCUMENTS

| 7,985,476 B2 | 7/2011 | Kurino et al. | |
| 2010/0002287 A1* | 1/2010 | Naijo | G02F 1/167 |
| | | | 359/296 |
| 2012/0313049 A1* | 12/2012 | Du | C09C 1/56 |
| | | | 252/500 |
| 2014/0376080 A1* | 12/2014 | Yokokawa | G02F 1/167 |
| | | | 359/296 |

FOREIGN PATENT DOCUMENTS

| JP | A-05-173193 | 7/1993 |
| JP | A-08-048910 | 2/1996 |
| JP | A-2005-227729 | 8/2005 |
| JP | A-2007-217242 | 8/2007 |

* cited by examiner

*Primary Examiner* — Bijan Ahvazi
(74) *Attorney, Agent, or Firm* — Oliff PLC

(57) ABSTRACT

Electrophoretic particle include a core particle; a siloxane-based compound that is bonded to a surface of the core particle and contains a connection structure in which a plurality of siloxane bonds are serially connected to each other; and a polarizing group that is an organic group bonded to the surface of the core particle, contains a main skeleton and a substituent bonded to the main skeleton, and has unevenly distributed electrons on the particle side of the main skeleton or the opposing side thereof.

19 Claims, 12 Drawing Sheets

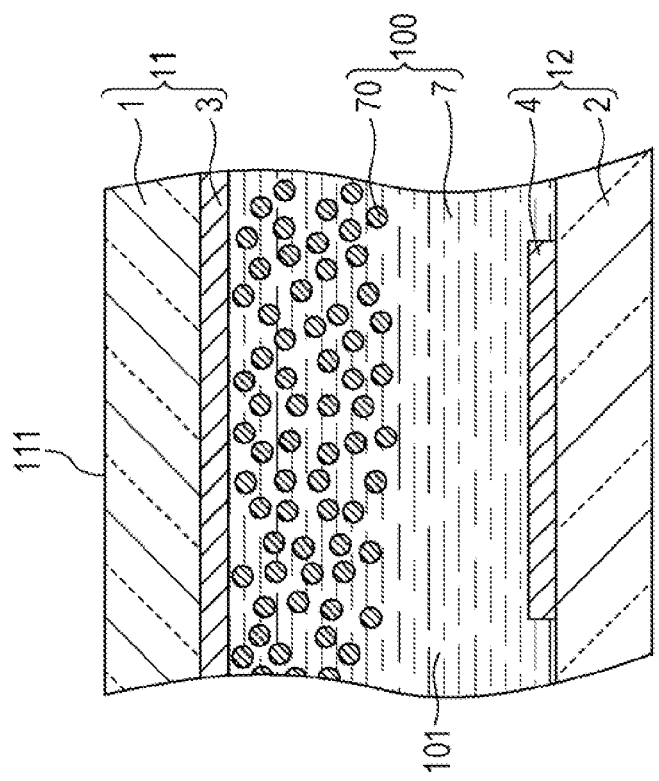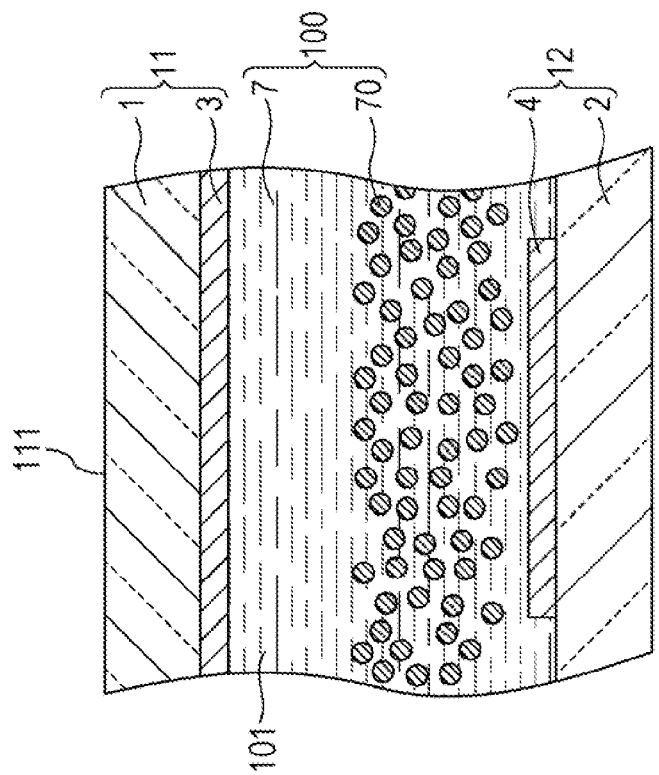

FIG. 6

| X | Y | Z |
|---|---|---|
| —NH$_2$ | (epoxide) | (N-methyl-2-hydroxybutylamine) |
| —NH$_2$ | —COOH | (N-methyl acetamide) |
| (epoxide) | —NH$_2$ | (N-methyl-2-hydroxybutylamine) |
| —NCO | —OH | (methyl N-methylcarbamate) |
| —NCO | —NH$_2$ | (N,N'-dimethylurea) |
| —SH | (epoxide) | (methylthio-2-hydroxybutane) |
| —(Si)—H | —C=C—R | (silyl-propyl) |

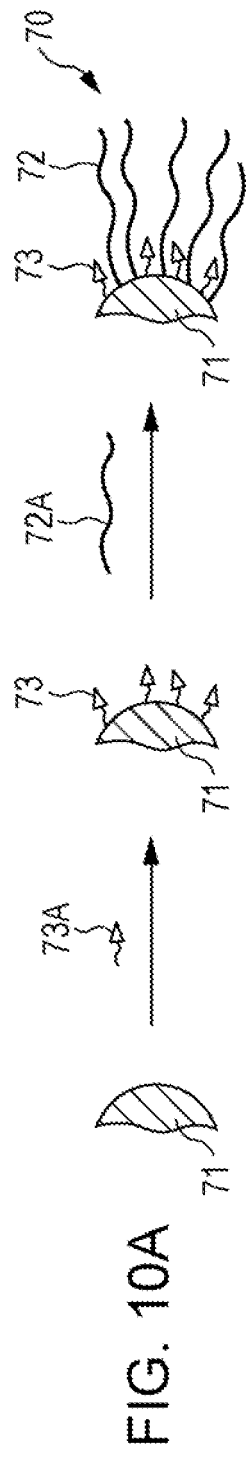
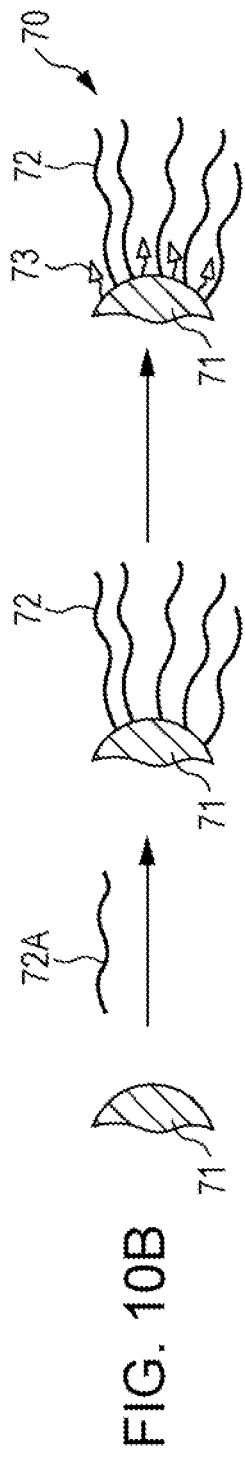
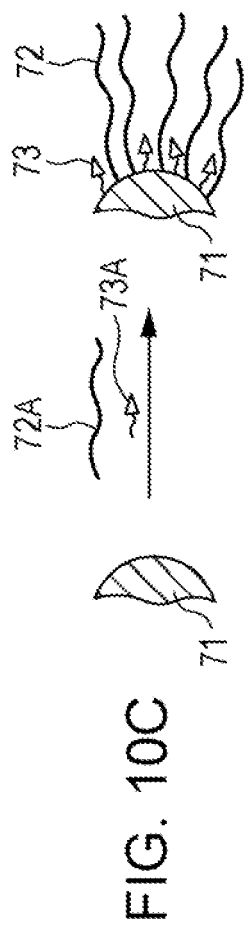
FIG. 10A
FIG. 10B
FIG. 10C

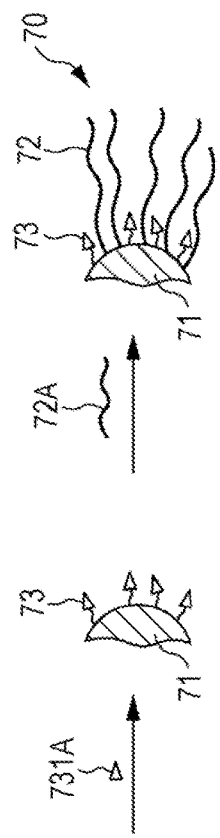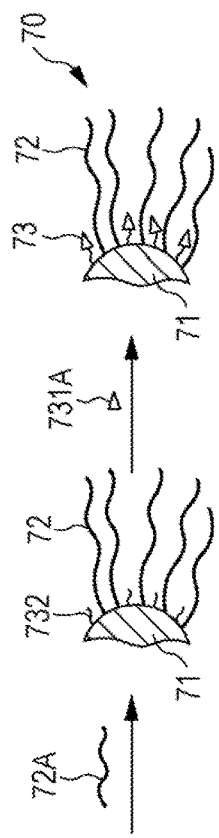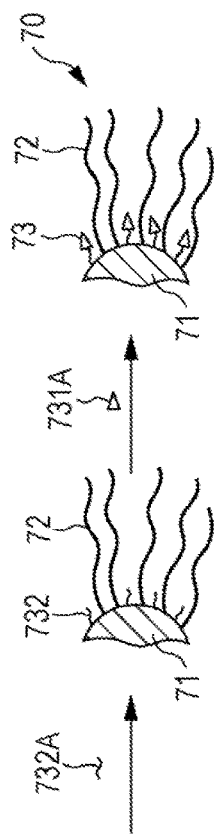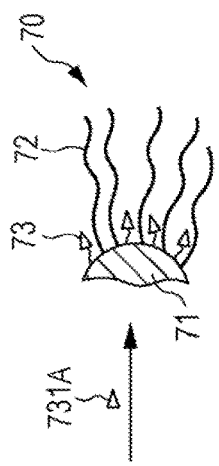

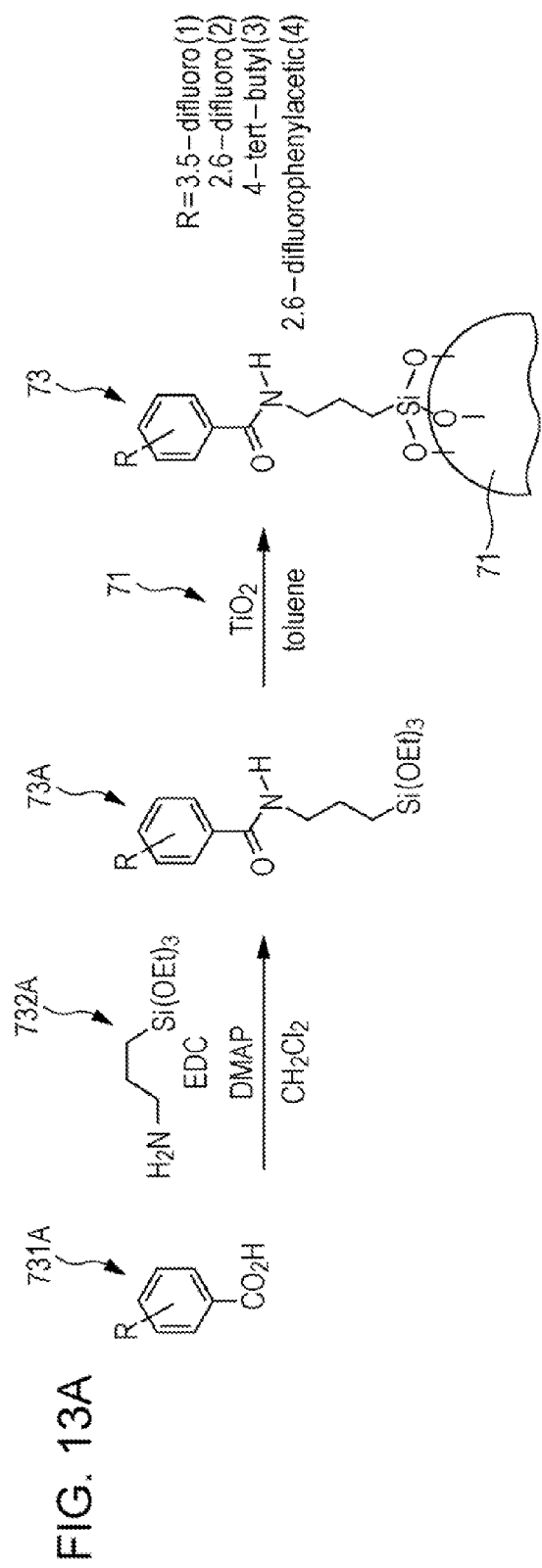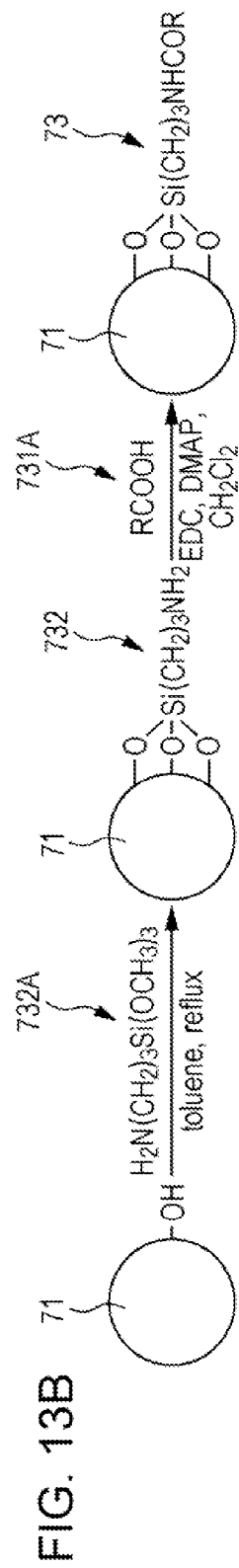
FIG. 13A
FIG. 13B

ELECTROPHORETIC PARTICLES, ELECTROPHORETIC DISPERSION LIQUID, DISPLAY SHEET, DISPLAY DEVICE, AND ELECTRONIC EQUIPMENT

BACKGROUND

1. Technical Field

The present invention relates to electrophoretic particles, an electrophoretic dispersion liquid, a display sheet, a display device, and electronic equipment.

2. Related Art

In general, it is known that fine particles move (phoresis) in a liquid by Coulomb force when an electric field is applied to a dispersed system to which the fine particles are dispersed in the liquid. This phenomenon is referred to as electrophoresis, and an electrophoretic display device on which desired information (image) is displayed using the electrophoresis has attracted attention in recent years as a new display device.

The electrophoretic display device has a display memory property and a wide viewing angle property in a state in which application of voltage is stopped and a display with high contrast is possible with low power consumption.

Further, the electrophoretic display device is gentle on the eyes when compared to a light emitting type display device, for example, a cathode-ray tube since the electrophoretic display device is a non-light emitting type display device.

In such an electrophoretic display device, a dispersed system (electrophoretic dispersion liquid) in which positively or negatively charged electrophoretic particles are dispersed into a dispersion medium are enclosed between a pair of substrates having an electrode, and the electrophoretic particles migrate to one substrate side and a desired image is displayed by application of a voltage between the pair of substrates (for example, see JP-A-5-173193).

In the related art, for securing dispersibility of the electrophoretic particles in a dispersion medium, an additive, for example, a dispersant, is added to a dispersion medium. However, in a case where an additive is used, it is difficult to reduce power consumption because electrical resistance of a dispersion medium is reduced and a leakage current is increased in a dispersion medium.

For this reason, in the related art, as disclosed in JP-A-5-173193, particles in which the surface of a mother particle is subjected to a treatment using an epoxy-modified coupling agent and then an amino-modified polymer is introduced are known as electrophoretic particles.

In the electrophoretic particles disclosed in JP-A-5-173193, even when the surface of the mother particle itself has a charging property, there is a problem in that the charging property is damaged and becomes insufficient because the entirety of the surface of mother particle is covered with a coupling agent without space. That is, the problem of the electrophoretic particle disclosed in JP-A-5-173193 is that it is difficult to both secure sufficient dispersibility in a dispersion medium and to exhibit desired compatible charging characteristics.

In addition, in the electrophoretic particles disclosed in JP-A-5-173193, even if it is possible to take an advantage of the charging property of the mother particle itself, controlling a charged state while the desired dispersibility is exhibited is difficult because the charging property of the electrophoretic particles highly depends on the charging property of the surface of the mother particle itself. Therefore, in a case where plural kinds of electrophoretic particles with different kinds of mother particles are mixed, the interaction between electrophoretic particles cannot be finely adjusted, so it is not possible to completely resolve coagulation of the electrophoretic particles at the time of applying an electric field. Further, when reactivity between the surface of the mother particle and the coupling agent is considered, the surface of the mother particle has a hydroxyl group in many cases, accordingly, it is difficult to obtain positively charged particles with excellent controllability.

SUMMARY

An advantage of some aspects of the invention is to provide electrophoretic particles which can exhibit excellent dispersibility in a display medium and can optionally control charging characteristics, an electrophoretic dispersion liquid containing such electrophoretic particles, a display sheet using such an electrophoretic dispersion liquid, a display device, and electronic equipment.

The advantage described above is achieved by aspects of the invention.

According to an aspect of the invention, there is provided electrophoretic particles including: a mother particle; a siloxane-based compound that is bonded to a surface of the mother particle and contains a connection structure in which a plurality of siloxane bonds are serially connected to each other; and a polarizing group that is an organic group bonded to the surface of the mother particle, contains a main skeleton and a substituent bonded to the main skeleton, and has unevenly distributed electrons on the mother particle side of the main skeleton or the opposing side thereof.

According to such electrophoretic particles, dispersibility in a dispersion medium can be increased due to the siloxane-based compound and a charging property can be applied by the polarizing group. In addition, the charging characteristics of the electrophoretic particles can be controlled by adjusting the kind or an amount of the polarizing group to be introduced. Accordingly, regardless of the kind of mother particle, charging characteristics of desired polarity or the charging amount can be exhibited.

In the electrophoretic particles according to the aspect of the invention, it is preferable that the occupancy rate of an area to which the siloxane-based compound is bonded on the surface of the mother particle be in the range of 0.05% to 20%.

In this manner, both of the dispersibility mainly generated due to the siloxane-based compound and the charging characteristics mainly generated due to the polarizing group can be further strengthened. In other words, both of the dispersibility and the charging characteristics can be achieved even in an environment in which the temperature of the electrophoretic dispersion liquid highly fluctuates or an environment in which the strength of an electric field is small.

In the electrophoretic particles according to the aspect of the invention, it is preferable that the total content of the siloxane-based compound and the polarizing group be in the range of 0.5 parts by mass to 10 parts by mass based on 100 parts by mass of the mother particle.

In this manner, the dispersibility in the dispersion medium of the electrophoretic particles can be improved.

In the electrophoretic particles according to the aspect of the invention, it is preferable that the occupancy rate of an area to which the polarizing group is bonded on the surface of the mother particle be lower than the occupancy rate of the area to which the siloxane-based compound is bonded on the surface of the mother particle.

In this manner, it is possible to prevent or suppress the polarizing group from inhibiting dispersibility generated due to the siloxane-based compound.

In the electrophoretic particles according to the aspect of the invention, it is preferable that the siloxane-based compound have a linear molecular structure that is formed of a main chain containing the connection structure and a side chain bonded to the main chain.

In this manner, since the molecular structure with a long chain shape of the siloxane-based compound is relatively stably maintained, the distance between particles separated from each other through the siloxane-based compound can be sufficiently secured. Therefore, the function of the siloxane-based compound of applying the dispersibility to the electrophoretic particles is further improved. In addition, a medium with relatively low polarity is widely used as a dispersion medium. On the other hand, many compounds containing a siloxane bond have relatively low polarity, but this depends on the structure of the side chain. Accordingly, the electrophoretic particles containing such siloxane-based compound exhibit particularly excellent dispersibility with respect to a dispersion medium.

In the electrophoretic particles according to the aspect of the invention, it is preferable that the siloxane-based compound have a structure derived from the coupling agent which is bonded to the surface of the mother particle and the connection structure be connected to the surface of the mother particle through the structure derived from the coupling agent.

In this manner, despite the fact that the linear molecular structure with a long chain shape is contained, the bonding amount with respect to the mother particle can be easily controlled, and thus it is possible to implement electrophoretic particles containing a siloxane-based compound whose bonding amount is precisely controlled to be a target amount.

In the electrophoretic particles according to the aspect of the invention, it is preferable that the siloxane-based compound have a hydrocarbon structure bonded to the surface of the mother particle, and the connection structure be connected to the surface of the mother particle through the hydrocarbon structure.

In this manner, since the most part of the siloxane-based compound becomes occupied by the siloxane bond, the dispersibility of the electrophoretic particles becomes particularly high when, for example, silicone oil or a modified material thereof is used as a dispersion medium.

In the electrophoretic particles according to the aspect of the invention, it is preferable that the weight average molecular weight of the siloxane-based compound be in the range of 1000 to 100000.

In this manner, the length of the molecular structure of the siloxane-based compound is optimized, and electrophoretic particles to which the dispersibility derived from a linear structure with a long chain shape is sufficiently applied can be obtained while an area which can introduce the polarizing group to the surface of the mother particle is sufficiently secured.

In the electrophoretic particles according to the aspect of the invention, it is preferable that the molecular weight of the polarizing group be smaller than the molecular weight of the siloxane-based compound.

In this manner, it is possible to prevent or suppress the polarizing group from inhibiting dispersibility generated due to the siloxane-based compound. In addition, since it is possible to reduce the occupancy rate of the area to which the siloxane-based compound is bonded on the surface of the mother particle, the area that can introduce the polarizing group to the surface of the mother particle may be sufficiently secured. Consequently, it is possible to expand the control width on the charging property.

In the electrophoretic particles according to the aspect of the invention, it is preferable that the main skeleton included in the polarizing group have a portion in which $\pi$ electrons are delocalized.

In this manner, movement of electrons in the main skeleton becomes easy and the electrons can be more unevenly distributed reliably in the main skeleton.

In the electrophoretic particles according to the aspect of the invention, it is preferable that the portion in which $\pi$ electrons are delocalized include a cyclic structure having a cyclic shape in at least a portion thereof.

In this manner, in the main skeleton, movement of electrons becomes easier and smoother.

In the electrophoretic particles according to the aspect of the invention, it is preferable that the cyclic structure be positioned on an end portion of the main skeleton, which is the side opposite to the mother particle, and the substituent be bonded to the cyclic structure.

In this manner, unevenness (polarization) in the electron density in the cyclic structure is easily generated, as a result, it is possible to make the unevenness in the electron density in the main skeleton further significant.

In the electrophoretic particles according to the aspect of the invention, it is preferable that the substituent be an electron attracting group or an electron donating group.

In this manner, the mother particle can be positively or negatively charged in a reliable manner.

In the electrophoretic particles according to the aspect of the invention, it is preferable that the main skeleton have a portion functioning as a spacer which is positioned between the mother particle and the cyclic structure.

In respective polarizing groups, since a portion (portion related to control of a charged state) showing characteristics (properties) is positioned by being appropriately separating from the mother particle, the characteristics of respective polarizing groups are further significantly exhibited.

In the electrophoretic particles according to the aspect of the invention, it is preferable that the polarizing group include a structure derived from a coupling agent which is bonded to the surface of the mother particle, and the cyclic structure be connected to the surface of the mother particle through the structure derived from the coupling agent.

In this manner, it is possible to easily and reliably introduce the polarizing group to the surface of the mother particle using a covalent bond.

According to another aspect of the invention, there is provided an electrophoretic dispersion liquid including: the electrophoretic particles of the invention; and a dispersion medium that allows the electrophoretic particles to be dispersed.

In this manner, it is possible to provide an electrophoretic dispersion liquid with excellent dispersibility and charging characteristics of the electrophoretic particles in the dispersion medium.

In the electrophoretic dispersion liquid according to the aspect of the invention, it is preferable that the relative dielectric constant of the dispersion medium be in the range of 1.5 to 3.

In this manner, it is possible to provide an electrophoretic dispersion liquid which has an excellent insulation property, suppresses the leakage current at the time of being supplied to an electrophoretic display device, and contributes to reducing power consumption.

According to still another aspect of the invention, there is provided a display sheet including: a first substrate on which a first electrode is provided; a second substrate that is arranged to face the first substrate and on which a second electrode is provided; and a display layer that is provided between the first substrate and the second substrate and contains the electrophoretic dispersion liquid of the invention.

In this manner, it is possible to provide a display sheet which can display an image with high contrast.

According to still another aspect of the invention, there is provided a display device including the display sheet of the invention.

In this manner, it is possible to provide a display device which can display an image with high contrast.

According to still another aspect of the invention of the invention, there is provided electronic equipment including the display device of the invention.

In this manner, it is possible to provide highly reliable electronic equipment.

BRIEF DESCRIPTION OF THE DRAWINGS

The invention will be described with reference to the accompanying drawings, wherein like numbers reference like elements.

FIGS. 3A and 3B are cross-sectional view describing driving of the display device shown in FIG. 1.

FIG. 6 is a view illustrating a specific example of a reactive functional group X contained in a coupling agent and a reactive functional group Y contained in modified silicone oil in regard to the coupling agent and the modified silicone oil used to obtain a siloxane-based compound having a structure Z shown in FIGS. 5A and 5B.

FIGS. 10A to 10C are views for describing an example of a method of producing electrophoretic particles of the invention.

FIGS. 11A to 11D are views for describing an example of a method of producing electrophoretic particles of the invention.

FIGS. 13A and 13B are views for describing an example of a method of producing a polarizing group of electrophoretic particles of the invention.

DESCRIPTION OF EXEMPLARY EMBODIMENTS

Hereinafter, electrophoretic particles, an electrophoretic dispersion liquid, a display sheet, a display device, and electronic equipment of the invention will be described in detail based on preferred embodiments shown in accompanying drawings.

Display Device

First Embodiment

First, a display device according a first embodiment of the invention will be described.

Figure 1:
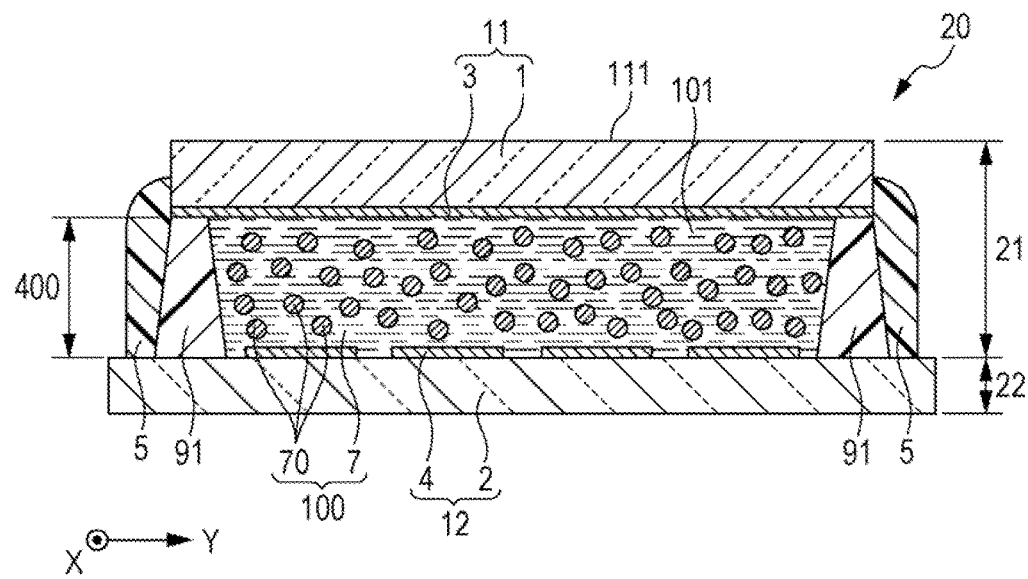
FIG. 1 is a cross-sectional view illustrating a display device of a first embodiment of the invention.
Figure 2:
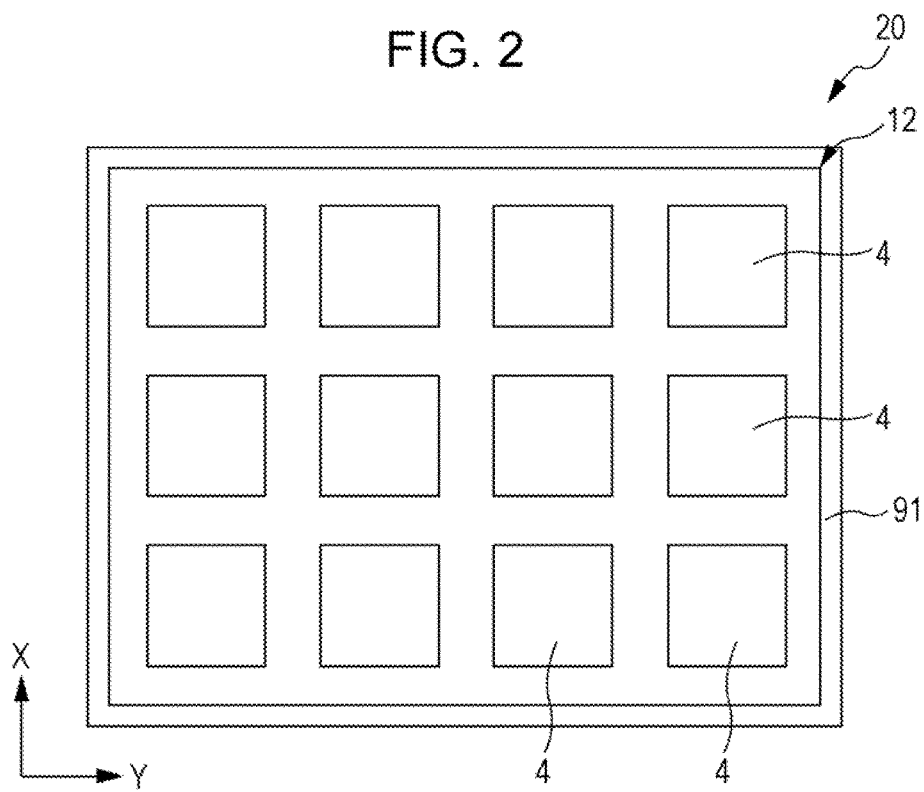
FIG. 2 is a plan view (top view) of the display device shown in FIG. 1.

FIG. 1 is a cross-sectional view illustrating a display device of a first embodiment of the invention. FIG. 2 is a plan view (top view) of the display device shown in FIG. 1. FIGS. 3A and 3B are cross-sectional view describing driving of the display device shown in FIG. 1. In addition, hereinafter, for convenience of description, the upside is described as "up" and the downside is described as "down" in FIGS. 1, 3A, and 3B. Further, as shown in FIG. 1, two directions orthogonal with each other when seen in a plan view of the display device are shown as "X direction" and "Y direction."

A display device (display device of the invention) 20 shown in FIG. 1 is an electrophoretic display device displaying a desired image using phoresis of particles. The display device 20 includes a display sheet (front plane) 21, and a circuit substrate (back plane) 22. In addition, the display sheet 21 and the circuit substrate 22 form a display sheet.

As shown in FIG. 1, the display sheet 21 includes a substrate (electrode substrate) 11 including a planar base portion 1, and a first electrode 3 provided on the lower surface of the base portion 1, and a display layer 400 provided below the substrate 11 and filled with a dispersion liquid 100 containing electrophoretic particles 70. In such a display sheet 21, the upper surface of the substrate 11 forms a display surface 111.

On the other hand, the circuit substrate 22 includes a substrate 12 including a planar base portion 2 and a plurality of second electrodes 4 provided on the upper surface of the base portion 2, and an electric circuit (not illustrated) provided in the substrate 12.

The electric circuit includes a TFT (switching element) which is arranged in a matrix; a gate line and a data line which are formed corresponding to the TFT; a gate driver which applies a desired voltage to the gate line; a data driver which applies a desired voltage to the data line; and a control unit which controls driving of the gate driver and the data driver.

Hereinafter, configurations of respective units will be described in order.

Substrate

The base portion 1 and the base portion 2 include a sheet-like (planar) member respectively, and have functions of supporting and protecting each member arranged between the base portions. As each of the base portions 1 and 2, a flexible portion or a hard portion may be used, but a flexible portion is preferably used. By using base portions 1 and 2 having flexibility, a display device 20 having flexibility, that is, a display device 20 useful for constructing, for example, electronic paper can be obtained.

In a case in which the base portions 1 and 2 have flexibility, as a constituent material, glass or a resin with high transparency can be exemplified. Examples of the resin include polyester such as polyethylene terephthalate (PET), polyethylene naphthalate (PEN); polyolefin such as polyethylene; various thermoplastic elastomers such as modified polyolefin, cyclic olefin (COP), polyamide, thermoplastic polyimide, polyether, polyether ether ketone, polycarbonate (PC), polyurethane-based and chlorinated polyethylene-based, a copolymer mainly formed of these, a blend, and a polymer alloy, and these can be used by mixing one or more kinds thereof.

The average thickness of the base portions 1 and 2 is appropriately set respectively in consideration of the constituent materials and the use, and is not particularly limited. However, in a case in which the base portions have flexibility, the average thickness thereof is preferably in the range of 20 μm to 500 μm, more preferably in the range of 25 μm to 250 μm, and still more preferably in the range of 50 μm to 200 μm. In this manner, it is possible to realize miniaturization (particularly thinning) of the display device 20 while balancing between the flexibility and the strength of the display device 20.

The first electrode 3 and the second electrode 4 having a film form are provided respectively on the surface of the display layer 400 side of these base portions 1 and 2, that is, the lower surface of the base portion 1 and the upper surface of the base portion 2. In the present embodiment, the first electrode 3 is used as a common electrode and the second electrode 4 is used as an individual electrode (pixel electrode connected to the TFT) which is divided so as to be arranged in zigzag in an X direction and a Y direction. In the display device 20, an area on which one second electrode 4 and one first electrode 3 overlap each other forms one pixel.

Constituent materials of the electrodes 3 and 4 are not particularly limited as long as the materials substantially have conductivity, and examples thereof include various conductive materials, for example, metal materials such as gold, silver, copper, and aluminum, or an alloy containing these; carbon-based materials such as carbon black, graphene, carbon nanotube, and fullerene; conductive polymer materials such as polyacetylene, polyfluorene, and polythiophene, or a derivative of these; ion conductive polymer materials which disperse ionic substances such as NaCl, and $Cu(CF_3SO_3)_2$ into a matrix resin such as polyvinyl alcohol or polycarbonate; conductive oxide materials such as an indium oxide (IO), an indium tin oxide (ITO), a fluorine-doped oxide tin (FTO), and zinc oxide (ZnO), and these can be used by combining one or more kinds thereof.

The average thickness of the electrodes 3 and 4 is appropriately set respectively in consideration of the constituent materials and the use, and is not particularly limited. However, the average thickness thereof is preferably in the range of 0.01 μm to 10 μm and more preferably in the range of 0.02 μm to 5 μm.

Here, from among each of the base portions 1 and 2 and each of the electrodes 3 and 4, the base portion and the electrode arranged on the display surface 111 side have a light transmission property, that is, they are substantially transparent (colorless and transparent, colored and transparent or translucent). In the present embodiment, for constituting the display surface 111 by the upper surface of the substrate 11, at least the base portion 1 and the first electrode 3 are substantially transparent. In this manner, an image displayed on the display device 20 can be visually recognized easily from the display surface 111 side.

Sealing Unit

A sealing unit (seal portion) 5 is provided between the substrates 11 and 12 along the edge portions of the substrates. The display layer 400 is airtightly sealed by the sealing unit 5. As a result, penetration of moisture into the display device 20 is prevented and deterioration of display performance of the display device 20 can be reliably prevented.

Examples of the constituent materials of the sealing unit 5, which are not particularly limited, include various resin materials, for example, a thermoplastic resin such as an acrylic-based resin, a urethane-based resin, or an olefin-based resin, and a thermosetting resin such as an epoxy-based resin, a melamine-based resin, a phenol-based resin, or a silicone-based resin, and these can be used by combining one or more kinds thereof.

Further, the height of the sealing unit 5, which is not particularly limited, is preferably in the range of 5 μm to 100 μm.

Wall Portion

As shown in FIG. 1, the display layer 400 includes a wall portion (partition) 91 provided so as to enclose the outer edge, a space (dispersion liquid sealing space) 101 divided into the substrate 11, the substrate 12, and the wall portion 91, and a dispersion liquid 100 filling the space 101.

Various repellent treatments such as a fluorine carbide plasma treatment are applied to the surface of the wall portion 91 if necessary. Accordingly, as described below, production of the display device 20 can be more simply performed, and the display device 20 which can exhibit more excellent display characteristics and reliability can be obtained.

Examples of the constituent materials of the wall portion 91, which are not particularly limited, include various thermoplastic resins or thermosetting resins such as an epoxy resin, an acrylic resin, a phenol resin, a urea resin, a melamine resin, a polyester (unsaturated polyester), polyimide, a silicone resin, and a urethane resin, and these can be used as a combination of one or more kinds thereof.

The height of the wall portion 91 is not particularly limited, but is preferably in the range of 5 μm to 100 μm. It is possible to move electrophoretic particles 70 according to an electric field in a short period of time and to prevent the electrophoretic particles 70 from being transparent in a non-display state by setting the height of the wall portion 91 to be within the above-described range.

The average width of the wall portion 91 is appropriately set in consideration of mechanical strength required by the wall portion 91, but is preferably in the range of 1 μm to 10 μm. In addition, the aspect ratio (average height/average width) of the wall portion 91 is preferably in the range of 1 to 50.

Further, in the present embodiment, the cross-sectional shape of the wall portion 91 has a reversed tapered shape whose width is gradually reduced from the substrate 12 toward the substrate 11 side, but is not particularly limited thereto, and may be, for example, a square (rectangle).

In addition, the cross-sectional shape of the wall portion 91 may not be constant in the entire cross section and parts may be different. In this case, since the airtightness of the space 101 is decreased in the site, even when bubbles are mixed into the space 101, the bubbles can be discharged to the outside.

Dispersion Liquid

The dispersion liquid (electrophoretic dispersion liquid) 100 contains a dispersion medium 7 and electrophoretic particles 70 which are dispersed into the dispersion medium 7.

The electrophoretic particles 70 are positively or negatively charged and have a different color from the color of the dispersion medium 7.

The color of the electrophoretic particles 70 is not particularly limited as long as the color is different from the color of the dispersion medium 7. For example, in a case where the dispersion medium 7 has a light color or a white color, the electrophoretic particles preferably has a dark color or a black color, on the contrary, in a case where the dispersion medium 7 has a dark color or a black color, the electrophoretic particles preferably has a light color or a white color. In this manner, since there is a brightness difference between the electrophoretic particles 70 and the dispersion medium 7 becomes large, for example, when the electrophoretic particles 70 are locally aggregated, the brightness difference between the area in which the particles are aggregated and an area (area occupied by the dispersion medium 7) adjacent to the area becomes larger, and thus a display with high contrast is possible by controlling the aggregation area of the electrophoretic particles 70. In addition, the electrophoretic particles 70 will be described below.

As the dispersion medium 7, a medium which has a high boiling point of 100° C. or higher and has a relatively high insulation property is preferably used. Examples of such a dispersion medium 7 include various kinds of water (for example, distilled water, pure water, and the like); alcohols such as butanol and glycerin; cellosolves such as butyl cellosolve; esters such as butyl acetate; ketones such as dibutyl ketone; aliphatic hydrocarbons (liquid paraffin) such as pentane; alicyclic hydrocarbons such as cyclohexane; aromatic hydrocarbons such as xylene; halogenated hydrocarbons such as methylene chloride, aromatic heterocycles such as pyridine; nitriles such as acetonitrile; amides such as N,N-dimethylformamide; carboxylate, silicone oil, and various other oils, and these can be used alone or as a mixture.

Among these, as the dispersion medium 7, a medium having aliphatic hydrocarbons (liquid paraffin) or silicone oil as a main component is preferable. Since the dispersion medium 7 having liquid paraffin or silicone oil as a main component has an effect of highly suppressing coagulation of the electrophoretic particles 70, it is possible to suppress deterioration of display performance of the display device 20 with time. Further, the liquid paraffin or the silicone oil has excellent weather resistance because the liquid paraffin or the silicone oil has no saturated bond, and is highly stable.

Further, as the dispersion medium 7, a medium having a relative dielectric constant of 1.5 to 3 is preferably used and a medium having a relative dielectric constant of 1.7 to 2.8 is more preferably used. Such a dispersion medium 7 has excellent dispersibility of the electrophoretic particles 70 containing a siloxane-based compound 72 described below and an excellent electric insulation property. Accordingly, such a dispersion medium contributes to implementing the display device 20 which can display an image with high contrast with lower power consumption. Further, the value of the dielectric constant is a value measured at 50 Hz and a value obtained by measuring the dispersion medium 7 whose moisture content is 50 ppm or less at a temperature of 25° C.

Hereinbefore, the configuration of the display device 20 has been described. Such a display device 20 is driven as described below. Further, in the following description, a case of applying a voltage to one of a plurality of second electrodes 4 shown in FIG. 1 will be described. Further, in the following description, the electrophoretic particles 70 are considered to be positively charged.

When a voltage in which the second electrode 4 reaches a negative potential is applied to between the first electrode 3 and the second electrode 4, an electric field generated by the voltage application is reacted on the electrophoretic particles 70 in the display layer 400. As a result, the electrophoretic particles 70 migrate to the second electrode 4 side and are then aggregated. Accordingly, as shown in FIG. 3A, the color of the dispersion medium 7 is mainly displayed on the display surface 111.

In contrast, when a voltage in which the second electrode 4 reaches a positive potential is applied to between the first electrode 3 and the second electrode 4, an electric field generated by the voltage application is reacted on the electrophoretic particles 70 in the display layer 400. As a result, the electrophoretic particles 70 migrate to the first electrode 3 side and are then aggregated. Accordingly, as shown in FIG. 3B, the color of the electrophoretic particles 70 is mainly displayed on the display surface 111.

By driving the electrophoretic particles 70 for each pixel (for each second electrode 4) as described above, a desired image can be displayed on the display surface 111.

In this manner, the display device 20 allows the electrophoretic particles 70 to migrate according to the orientation of the electric field and displays an image by a difference of chromaticity and brightness generated due to the migration. At this time, in order to display an excellent image, it is necessary for a plurality of the electrophoretic particles 70 to stably exist in the dispersion medium 7 without aggregation and to migrate immediately when an electric field is generated. That is, in the electrophoretic particles 70, it is necessary to achieve both the dispersibility in the dispersion medium 7 (hereinafter, simply referred to as "dispersibility") and charging characteristics.

Electrophoretic Particles

Hereinafter, the electrophoretic particles 70 contained in the dispersion liquid 100 will be described in detail.

Figure 4:
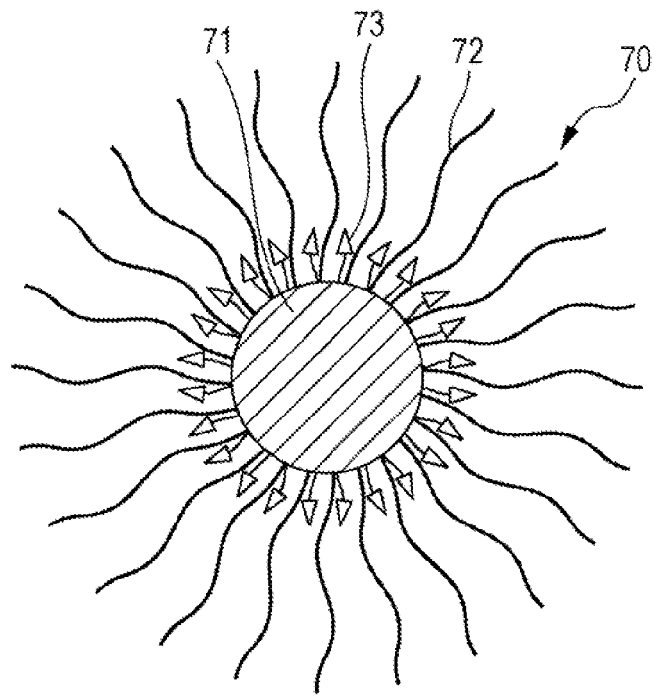
FIG. 4 is a cross-sectional view schematically illustrating electrophoretic particles used for the display device shown in FIG. 1.
Figure 5A:
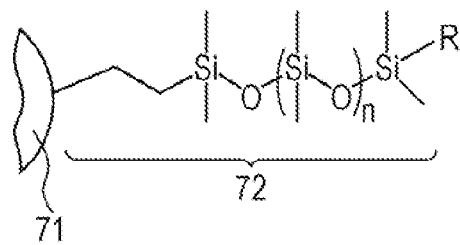
FIGS. 5A and 5B are views for describing a siloxane-based compound connected to the surface of a mother particle of electrophoretic particles shown in FIG. 4.
Figure 5B:
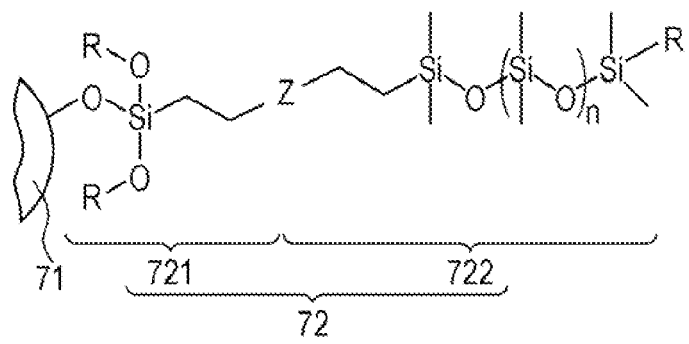

FIG. 4 is a cross-sectional view schematically illustrating the electrophoretic particles used for the display device shown in FIG. 1. FIGS. 5A and 5B are views for describing a siloxane-based compound connected to the surface of the mother particle of the electrophoretic particles shown in FIG. 4. FIG. 6 is a view illustrating a specific example of a reactive functional group X contained in a coupling agent and a reactive functional group Y contained in modified silicone oil in regard to the coupling agent and the modified silicone oil used to obtain a siloxane-based compound having a structure Z shown in FIGS. 5A and 5B. FIGS. 7A to 7F are views for describing a polarizing group connected to the surface of the electrophoretic particle shown in FIG. 4.

As shown in FIG. 4, the electrophoretic particles 70 include a core particle 71 (mother particle), a siloxane-based compound 72 connected to the surface of the core particle 71, and a polarizing group 73.

Since such electrophoretic particles 70 are inhibited from significantly approaching other electrophoretic particles 70 by the siloxane-based compound 72, appropriate dispersibility in the dispersion medium 7 is applied. Further, since the siloxane-based compound 72 has a high affinity for the non-polar or low-polar dispersion medium 7, it is possible to improve the dispersibility of the electrophoretic particles 70 in the dispersion medium 7. In addition, since the siloxane-based compound 72 is highly effective for improving the dispersibility of the electrophoretic particles 70 in the dispersion medium 7, an area in which the surface of the core particle 71 is covered by the siloxane-based compound 72 can be reduced. Accordingly, an area to which the polarizing group 73 can be bonded on the surface of the core particle 71 can be sufficiently secured.

On the other hand, the charging characteristics are applied to the core particle 71 by the polarizing group 73. Further, it is possible to adjust a charged state such as a charging amount or polarity of the electrophoretic particles 70 by adjusting the kind or the amount of the polarizing group 73. Particularly, as described above, since an area to which the polarizing group 73 can be bonded on the surface of the core particle 71 is sufficiently secured, the control width on the charged state can be expanded. Therefore, regardless of the kind of the core particle 71, the charging characteristics of the polarity or the charging amount of the electrophoretic particles 70 can be made to be desirable.

For this reason, the electrophoretic particles 70 can exhibit excellent dispersibility with respect to the dispersion medium 7 and excellent charging characteristics. Accordingly, since the aggregation of the electrophoretic particles 70 are suppressed by a constant repulsive force generated due to the siloxane-based compound 72, phoresis resistance of the electrophoretic particles 70 is decreased and constant Coulomb's force is generated in the electrophoretic particles 70 by the polarizing group 73, and as a result, electrophoresis which is sufficient even when the electric field becomes weaker can be realized. Therefore, it is possible to display an image with lower power consumption and high responsiveness.

Further, since the dispersibility of the electrophoretic particles 70 can be improved by the siloxane-based compound 72 as described above, a dispersant may not be added to the dispersion medium 7 at all. Consequently, the insulation property between the first electrode 3 and the second electrode 4, which is generated when a large amount of dispersant is added, can be prevented from being deteriorated. In this manner, generation of the leakage current at the time of voltage application is suppressed, and the power consumption of the display device 20 can be lowered.

In addition, a dispersant may be added to the dispersion medium 7, but the amount of the dispersant to be added to the dispersion medium 7 can be reduced in this case, so the insulation property between the first electrode 3 and the second electrode 4 can be suppressed. Examples of such a dispersant include polyamide amine and salts thereof, basic functional group modified polyurethane, basic functional group modified polyester, basic functional group modified poly(meth)acrylate, polyoxyethylene alkyl amine, alkanol amine, and polyacryl amide, and a mixture of one or more kinds thereof can be used.

The amount of the dispersant to be added is preferably 0.3% by mass or less and more preferably 0.1% by mass or less with respect to the dispersion medium 7. By suppressing the amount of the dispersant to be added to be with the above-described range, deterioration of the insulation property between the first electrode 3 and the second electrode 4 can be minimized even when the dispersant is added.

Hereinafter, each unit constituting the electrophoretic particles 70 will be sequentially described in detail.

First, the core particle 71 will be described.

Examples of the core particle 71, which are not particularly limited, include oxide-based particles such as titanium oxide, zinc oxide, iron oxide, chrome oxide, and zirconium oxide; nitride-based particles such as silicon nitride and titanium nitride; sulfide-based particles such as zinc sulfide; boride-based particles such as titanium boride; inorganic pigment particles such as strontium chromate, cobalt aluminate, copper chromite, and ultramarine; azo-based, quinacridone-based, anthraquinone-based, dioxazine-based, and perylene-based organic pigment particles. Further, composite particles in which the surface of a resin particle including an acrylic resin, a urethane resin, a urea resin, an epoxy resin, polystyrene, and polyester is coated with a pigment can be used.

In addition, as the core particle 71, in a case of using a coupling agent as described below, it is preferable that a hydroxyl group exist on the surface of the core particle 71 when considering reactivity with the coupling agent, so inorganic materials are preferably used.

Further, the average particle size of the core particle 71, which is not particularly limited, is preferably in the range of 10 nm to 800 nm and more preferably in the range of 20 nm to 400 nm. It is possible to achieve both the display with sufficient chromaticity by the electrophoretic particles 70 and rapid electrophoresis of the electrophoretic particles 70 by setting the average particle size of the core particles 71 to be within the above-described range. As a result, it is possible to achieve both the display with high contrast and high responsiveness.

Further, by setting the average particle size of the core particle 71 to be within the above-described range, it is possible to suppress precipitation in the electrophoretic particles 70 or variation of the speed of phoresis, and then prevent generation of display unevenness or display defects.

Furthermore, the average particle size of the core particle 71 means a volume average particle size measured by a dynamic light scattering particle size distribution measuring device (for example, LB-500 (trade name), manufactured by Horiba, Ltd.).

Furthermore, in the present embodiment, a case in which one kind of core particle 71 is contained in the dispersion liquid 100 has been described, but plural kinds of core particles 71 may be contained therein. In this case, for example, a display with higher contrast is possible by selecting plural kinds of core particles 71 by combining particles with large different brightness or chromaticity, for example, a white color and a black color, or a light color and a dark color. In addition, in a case of using different plural kinds of core particles 71, the kinds or the amounts of the siloxane-based compound 72 and the polarizing group 73 to be introduced may be the same as or different from each other in the different plural kinds of core particles 71.

Next, the siloxane-based compound 72 will be described.

The siloxane-based compound 72 may be any compound as long as the compound has a connection structure (hereinafter, also referred to as a "silicone main chain") in which plural siloxane bonds are serially connected, but preferably, is a compound having a linear molecular structure which is formed of a main chain having the connection structure and a side chain bonded to the main chain. Since when the siloxane-based compound is such a compound, the molecular structure with a long chain shape of the siloxane-based compound 72 is relatively stably maintained and the separated distance between the core particles 71 can be kept sufficiently large through the siloxane-based compound 72, the function of applying the dispersibility to the electrophoretic particles 70 of the siloxane-based compound 72 is further improved.

In addition, a medium with relatively low polarity (non-polarity or low polarity) is widely used as the dispersion medium 7. On the other hand, there are many compounds with relatively low polarity in the compound containing a siloxane bond, but this depends on the structure of the side chain. Accordingly, the electrophoretic particles 70 containing such a siloxane-based compound 72 exhibit particularly excellent dispersibility with respect to the dispersion medium 7.

Further, it is preferable that the siloxane-based compound 72 contain a structure (hereinafter, also referred to as "a structure derived from silicone oil") derived from silicone oil having a silicone main chain or a modified material thereof. Since the silicone oil or the modified material is used as the dispersion medium 7 in many cases, the dispersibility of the electrophoretic particles 70 is particularly improved by the siloxane-based compound 72 containing the structure derived therefrom.

Such a structure derived from the silicone oil may be directly connected to the surface of the core particle 71 as shown in FIG. 5A or may be connected to the surface of the core particle 71 through the structure derived from a coupling agent as shown in FIG. 5B.

More specifically, the siloxane-based compound 72 of the example shown in FIG. 5A can be obtained by reacting the functional group derived from silicone oil and the hydroxyl group on the surface of the core particle 71. The siloxane-based compound 72 of the example is formed only by the structure derived from silicone oil, and a hydrocarbon structure bonded to the terminal of the main chain (silicone main chain) including siloxane bonds is connected to the core particle 71. Accordingly, since the siloxane-based compound 72 is mostly occupied by the siloxane bond, the dispersibility of the electrophoretic particles 70 is particularly improved, for example, when silicone oil or a modified material thereof is used as the dispersion medium 7.

On the other hand, the siloxane-based compound 72 of the example shown in FIG. 5B can be obtained by reacting modified silicone oil and a coupling agent and by carrying out a dehydration condensation reaction between a hydrolysable group derived from the coupling agent and a hydroxyl group on the surface of the core particle 71 in the obtained resultant. The siloxane-based compound 72 of the example is formed of the structure derived from the silicone oil and the structure derived from the coupling agent and a structure 722 derived from the silicone oil is connected to the core particle 71 through a structure 721 derived from the coupling agent. The siloxane-based compound 72 having such a structure is useful in that the bonded amount with respect to the core particle 71 can be easily controlled, therefore, the electrophoretic particles 70 containing the siloxane-based compound 72 precisely controlled to have a target amount can be implemented even though the siloxane-based compound 72 includes a linear molecular structure with a long chain shape. In other words, it is highly difficult for the siloxane-based compound 72 containing a linear molecular structure with a long chain shape to accurately introduce the target amount with respect to the core particle 71, but it is possible to perform a process of sufficiently securing reaction opportunities between the modified silicone oil and the coupling agent in advance by mediating between the structure 722 derived from the silicone oil and the core particles 71 by the structure 721 derived from the coupling agent. Therefore, high reactivity of the coupling agent with respect to the core particle 71 can be effectively used, and as a result, the amount of the siloxane-based compound 72 to be introduced can be accurately controlled.

The weight average molecular weight of the siloxane-based compound 72 is preferably in the range of 1000 to 100000 and more preferably in the range of 10000 to 60000. The length of the molecular structure of the siloxane-based compound 72 can be optimized by setting the weight average molecular weight to be within the above-described range and electrophoretic particles 70 to which dispersibility derived from the linear structure with a long chain shape is sufficiently applied can be obtained while an area in which the polarizing group 73 can be introduced to the surface of the core particle 71 is sufficiently secured.

Moreover, the weight average molecular weight of the siloxane-based compound 72 means weight average molecular weight in terms of polystyrene which is measured using gel permeation chromatography (GPC).

Further, n in FIGS. 5A and 5B is preferably in the range of 12 to 1400 and more preferably in the range of 130 to 800 for the same reason as that of the above-described weight average molecular weight.

The structure Z in FIG. 5B is a structure obtained by reacting the reactive functional group X contained in a coupling agent and the reactive functional group Y contained in the silicone oil.

As the reactive functional groups X and Y, for example, groups shown in FIG. 6 can be exemplified. In addition, R in FIG. 6 is an aliphatic hydrocarbon group such as an alkyl group.

Further, it is preferable that the terminal and the side chain of the siloxane-based compound 72 be formed of a substituent with low polarity. In this manner, the dispersibility of the electrophoretic particles 70 can be further improved. Specific examples of the substituent include an alkyl group and the like.

In addition, the occupancy rate (coating rate) of the area to which the siloxane-based compound 72 is bonded on the surface of the core particle 71 is preferably in the range of 0.05% to 20%, more preferably in the range of 0.1% to 10%, and still more preferably in the range of 0.2% to 5%. By setting the occupancy rate of such an area to be within the above-described range, it is possible to achieve both the dispersibility mainly generated due to the siloxane-based compound 72 and the charging characteristics mainly generated due to the polarizing group 73. That is, it is possible to achieve both the dispersibility and the charging characteristics even in an environment in which the temperature of the dispersion liquid 100 largely fluctuates or in an environment with a weak electric field.

In addition, in a case where the occupancy rate of the area is below the above-described lower limit, there is a concern that the dispersibility is decreased and the electrophoretic particles 70 are aggregated depending on the environment of the dispersion liquid 100. In contrast, in a case where the occupancy rate of the area is above the above-described upper limit, there is a concern that the introduction of the polarizing group 73 to the surface of the core particle 71 becomes difficult depending on the kind of the method of producing electrophoretic particles 70. Further, even when the polarizing group 73 can be introduced to the surface of the core particle 71, there is a concern that influence of the charging characteristic due to the polarizing group 73 becomes small depending on the kind of the core particle 71 and the polarizing group 73 and the adjustment width of the charging characteristics due to the polarizing group 73 becomes small.

Here, the occupancy rate (coating rate) [%] of the area to which the siloxane-based compound 72 is bonded on the surface of the core particle 71 can be acquired by the following expression in a case where the area occupied by one molecule of the siloxane-based compound 72 bonded to the surface of the core particle 71 is referred to as "unit area"

and the number of molecules of the siloxane-based compound 72 bonded to the surface of the core particle 71 is referred to as "number of molecules."

Occupancy rate(coating rate)=(unit area×number of molecules)/(surface area of core particle)×100

Here, the "unit area" can be acquired by calculation from the molecular structure of the siloxane-based compound 72.

In addition, the "number of molecules" can be acquired by calculation from the mass [g] of the siloxane-based compound 72 bonded to one core particle, the molecular weight [g/mol] of the siloxane-based compound 72, and the number of molecules of $6.02\times10^{23}$ [number/mol] per one mole.

Further, the occupancy rate (coating rate) [%] of the area to which the polarizing group 73 is bonded to the surface of the core particle 71 described below can be acquired in the same manner.

Next, the polarizing group 73 will be described.

The polarizing group 73 is an organic group including a main skeleton and a substituent connected to the main skeleton.

In the polarizing group 73, electrons are unevenly distributed (polarization) in the main skeleton and thus the charged state of the electrophoretic particles 70 is controlled by setting at least one condition from among the kind of substituent (an electron attracting group and/or an electron donating group), the number of bonds, and the bonded position with respect to the main skeleton.

That is, for example, in the polarizing group 73 to which an electron attracting group is bonded as a substituent on the end portion (hereinafter, referred to as a "terminal of the main skeleton") side which is the opposite side to the core particle 71 of the main skeleton, electrons are unevenly distributed on the terminal side rather than the core particle 71 side of the main skeleton. When such a polarizing group 73 is introduced, the core particle 71 (electrophoretic particles 70) is negatively charged.

In contrast, in the polarizing group 73 to which an electron attracting group is bonded as a substituent on the core particle 71 side of the main skeleton, electrons unevenly distributed on the core particle 71 side rather than the terminal side of the main skeleton. Such a polarizing group 73 is introduced, the core particle 71 (electrophoretic particles 70) is positively charged.

further, in the polarizing group 73 to which an electron donating group is bonded as a substituent, since unevenness of the electron density is generated in the opposite manner from the description above, the core particle 71 (electrophoretic particles 70) is positively charged when the polarizing group 73 to which the electron donating group is bonded is introduced to the terminal side of the main skeleton, and the core particle 71 (electrophoretic particles 70) is negatively charged when the polarizing group 73 to which the electron donating group is bonded is introduced to the core particle 71 side of the main skeleton.

Further, the unevenness of the electron density tends to be increased as the number of bonds of the substituent bonded to the main skeleton is increased.

In the invention, the core particle 71 can be controlled (adjusted) to have a desired charged state by appropriately selecting and introducing the polarizing group 73 in which unevenness of the electron density is generated to the surface of the core particle 71.

Here, as the charged state of the core particle 71 (electrophoretic particles 70), positive or negative of an electric charge, the amount of electric charges, and distribution of the electric charge can be exemplified, but, according to the invention, particularly, at least one of positive or negative of the electric charge and the amount of electric charges can be easily controlled.

It is preferable that unevenness in the electron density be easily generated in the main skeleton of the polarizing group 73. Accordingly, it is preferable that the main skeleton include a portion (structure) in which $7t$ electrons are delocalized. In this manner, electrons can be easily moved in the main skeleton and the above-described effects are further significantly exhibited.

The entire portion in which the $\pi$ electrons are delocalized may have a structure in which conjugated double bonds are linearly bonded to one another, but it is preferable to have a cyclic structure having a cyclic shape in at least a portion thereof. Accordingly, the electrons can be easily and smoothly moved in the main skeleton.

There are various kinds of cyclic structures, but an aromatic ring is preferable and a benzene ring, a naphthalene ring, a pyridine ring, a pyrrole ring, a thiophene ring, an anthracene ring, a pyrene ring, a perylene ring, a pentacene ring, a tetracene ring, a chrysene ring, an azulene ring, a fluorenering, a triphenylene ring, a phenanthrene ring, a quinolinering, an indole ring, a pyrazine ring, an acrydine ring, a carbazole ring, a furan ring, a pyran ring, a pyrimidine ring, or a pyridazine ring is particularly preferable. In this manner, the unevenness (polarization) of the electron density is easily generated in the cyclic structure, as a result, the unevenness of the electron density in the main skeleton can be more significant.

Moreover, it is preferable that the main skeleton have a cyclic structure on the terminal thereof and a substituent be bonded to the cyclic structure. In this manner, the unevenness (polarization) of the electron density is easily generated in the cyclic structure, as a result, the unevenness of the electron density in the main skeleton can be more significant.

In the electrophoretic particles of the invention, the substituent is preferably an electron attracting group or an electron donating group.

In this manner, the mother particle can be positively or negatively charged in a more reliable manner.

Here, an example of a case in which the main skeleton has a benzene ring on the terminal thereof will be described.

Figure 7A:
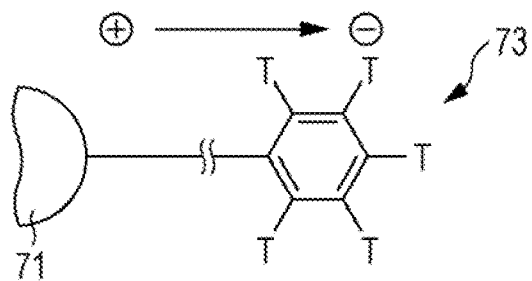
FIGS. 7A to 7F are views for describing a polarizing group connected to the surface of the electrophoretic particle shown in FIG. 4.

In this case, I: when an electron attracting group T is bonded to at least three positions (all positions of 2- to 6-positions in FIG. 7A) of the 3- to 5-positions among the 2- to 6-positions of the benzene ring as a substituent, electrons are attracted to the terminal side in the main skeleton by the existence of the electron attracting group T and then unevenly distributed as shown in FIG. 7A. Therefore, the core particle 71 is negatively charged.

Figure 7B:
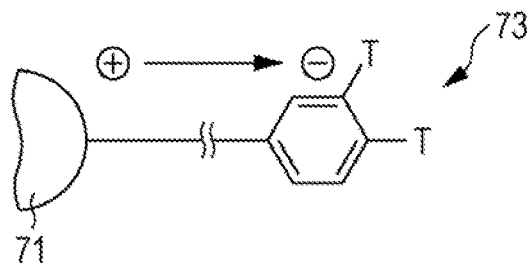

II: When the electron attracting group T is bonded to at least one position (the 3- and 4-positions in FIG. 7B) of the 3- to 5-positions of the benzene ring as a substituent, electrons are attracted to the terminal side in the main skeleton (particularly, on the benzene ring) by the existence of the electron attracting group T and then unevenly distributed as shown in FIG. 7B. Therefore, the core particle 71 is negatively charged.

Figure 7C:
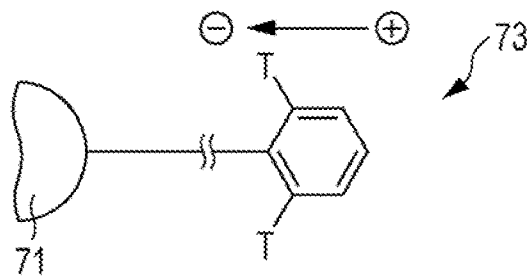

III: When the electron attracting group T is bonded to at least one position (the 2- and 6-positions in FIG. 7C) of the 2- and 6-positions of the benzene ring as a substituent, electrons are attracted to core particle 71 side in the main skeleton (particularly, on the benzene ring) by the existence of the electron attracting group T and then unevenly distributed as shown in FIG. 7C. Therefore, the core particle 71 is positively charged.

Figure 7D:
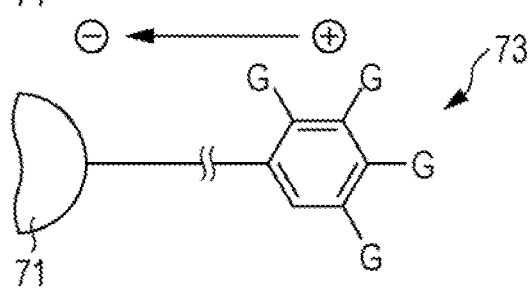

IV: When an electron attracting group G is bonded to at least three position (four positions of the 2- and 5-positions in FIG. 7D) of the 3- to 5-positions among the 2- to 6-positions of the benzene ring as a substituent, electrons are attracted to core particle 71 side in the main skeleton by the existence of the electron donating group G and then unevenly distributed as shown in FIG. 7D. Therefore, the core particle 71 is positively charged.

Figure 7E:
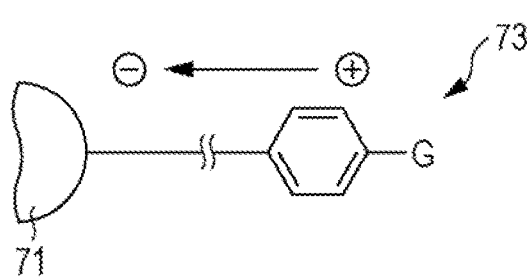
Figure 7F:
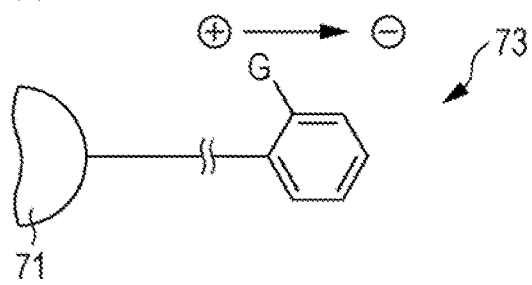

V: When the electron donating group G is bonded to at least one position (the 4-position in FIG. 7E) of the 3- to 5-positions of the benzene ring as a substituent, electrons are pushed to core particle 71 side in the main skeleton (particularly, on the benzene ring) by the existence of the electron donating group G and then unevenly distributed as shown in FIG. 7E. Therefore, the core particle 71 is positively charged.

VI: When the electron donating group G is bonded to at least one position (the 2-position in FIG. 7F) of the 2- and 6-positions of the benzene ring as a substituent, electrons are pushed to the terminal side in the main skeleton (particularly, on the benzene ring) by the existence of the electron donating group G and then unevenly distributed as shown in FIG. 7E. Therefore, the core particle 71 is negatively charged.

Further, the structures II and VI, and the structures III and V may be combined with each other. In this manner, the unevenness of the electron density in the main skeleton (particularly, on the benzene ring) can be more significant.

Furthermore, the main skeleton may be formed of only one cyclic structure described above, or the structure in which a plurality of cyclic structures are linearly bonded to one another. As a specific example of the main skeleton having the latter structure, the following formulae (A-1) to (A-3) can be exemplified.

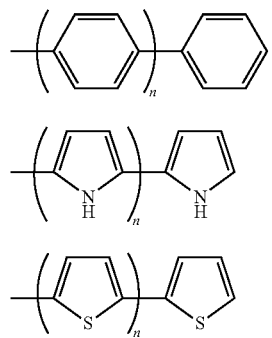

(A-1)

(A-2)

(A-3)

Provided that, n represents an integer of 1 or higher in the formulae (A-1) to (A-3) above.

Further, in the main skeleton represented by the formulae (A-1) to (A-3), the substituent is preferably bonded to the cyclic structure of the terminal, but may be bonded to another cyclic structure other than the terminal.

The electron attracting group T, which is not particularly limited, may be a substituent showing a tendency of strongly attracting (absorbing) electrons compared to hydrogen atoms, and examples thereof include a halogen atom such as F, Cl, Br, or I, a cyano group, a nitro group, a carboxyl group, a trifluoromethyl group, a formyl group, and a sulfo group. Among these, as the electron attracting group, at least one kind selected from a group consisting of a halogen atom, a cyano group, a nitro group, a carboxyl group, and a trifluoromethyl group may be preferable. These examples have particularly high ability of attracting electrons.

In contrast, the electron donating group G, which is not particularly limited, may be a substituent showing a tendency of strongly pushing (donating) electrons compared to hydrogen atoms, and examples thereof include an amino group, an alkyl group, an alkoxy group, and a hydroxyl group. Among these, as the electron donating group, at least one kind selected from a group consisting of an amino group, an alkoxy group, and an alkoxy group is preferable. These examples have particularly high ability of pushing electrons.

An alkyl group preferably has 1 to 30 carbon atoms and more preferably 1 to 18 carbon atoms. An alkoxy group preferably has 1 to 30 carbon atoms and more preferably 1 to 18 carbon atoms. In the alkyl group and the alkoxy group, when the number of carbon atoms is excessive, the alkyl group and the alkoxy group are likely to be aggregated, and therefore it may be difficult to adjust the charged state of the core particle 71 to be a desired state.

In addition, the total number of carbon atoms of the main skeleton is preferably in the range of 6 to 40 and more preferably in the range of 6 to 35. When the total number of carbon atoms is excessively small, delocalization of the electrons becomes difficult, so the unevenness of electrons may not be efficiently generated. In contrast, the total number of carbon atoms is excessively large, introduction of the polarizing group 73 to the surface of the core particle 71 may become difficult.

Further, it is preferable that the main skeleton include a portion (structure) functioning as a spacer on the core particle 71 side. That is, it is preferable that the main skeleton have a portion which functions as a spacer positioned between the core particle 71 and the cyclic structure. In this manner, in each polarizing group 73, the portion (portion related to the control of the charged state) exhibiting the characteristics (properties) is positioned by appropriately separating from the core particle 71, as a result, the characteristics of each of the polarizing groups 73 are more significantly exhibited.

As a structure of the portion functioning as a spacer (hereinafter, referred to as a "spacer portion"), various structures can be considered, and a saturated carbon chain or a structure having other bonds or atoms other than carbons on a portion thereof can be exemplified.

Here, as other bonds, unsaturated bonds such as bonds represented by the following formulae (B-1) to (B-23), double bonds, and triple bonds can be exemplified, but the bonds represented by the following formulae (B-1) to (B-23) are preferable.

(B-1)

(B-2)

(B-3)

(B-4)

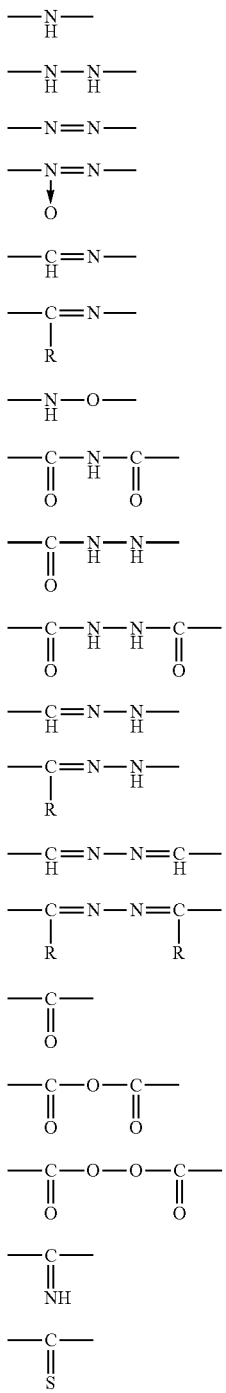

(B-5)
(B-6)
(B-7)
(B-8)
(B-9)
(B-10)
(B-11)
(B-12)
(B-13)
(B-14)
(B-15)
(B-16)
(B-17)
(B-18)
(B-19)
(B-20)
(B-21)
(B-22)
(B-23)

Each of the polarizing groups 73 can be more easily and reliably introduced to the surface of the core particle 71 through the bonds represented by the formulae (B-1) to (B-23).

In addition, since unevenness of the electron density is generated in the bond portions represented by the formulae (B-1) to (B-23), an attractive force and a repulsive force due to the unevenness of the electron density act between the adjacent polarizing groups 73 by the polarizing group 73 having these bonds. Accordingly, each of the polarizing groups 73 are arranged on a safer position on the surface of the core particle 71. Specifically, each of the polarizing groups 73 are accurately arranged along the normal direction of the surface of the core particle 71. As a result, a portion showing the characteristics of each polarizing groups 73 is positioned by separating from the core particle 71 in a more reliable manner, and the characteristics of each polarizing group 73 are more significantly exhibited.

Among these, particularly, an amide bond (formula (B-1)), a urethane bond (formula (B-2)), an ester bond (formula (B-3)), or a urea bond (formula (B-4)) is preferable. By selecting these bonds, the effects are more significantly exhibited.

On the other hand, as the atoms other than carbons, oxygen atoms and sulfur atoms can be exemplified. Each of the polarizing groups 73 can be more easily and reliably introduced to the surface of the core particle 71 through the oxygen atoms or sulfur atoms.

Among these, oxygen atoms are particularly preferable. The effects are more significantly exhibited by selecting oxygen atoms.

Further, as described above, since there is an appropriate range in the total number of carbon atoms of the main skeleton, a portion having a structure represented by the following formula (C) is particularly preferable as the portion functioning as a spacer in consideration of the appropriate range.

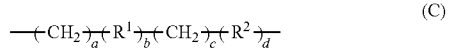

(C)

[Provided that, in the formula (C), $R^1$ and $R^2$ independently and respectively represent an amide bond, a urethane bond, an ester bond, a urea bond, or an oxygen bond, a represents an integer of 0 to 20, b represents an integer of 0 or 1, c represents an integer of 0 to 20, and d represents an integer of 0 or 1.]

Further, when the value of a becomes excessively large, an amide bond, a urethane bond, an ester bond, and a urea bond may easily form an aggregation whose urea bonds are unevenly distributed at a position separated from the core particle 71, and the characteristics of each of the polarizing groups 73 may not be sufficiently exhibited. Accordingly, in the formula (C) above, a is preferably in the range of 2 to 4 (particularly, 3 or 4).

Further, when the value of c is excessively large, distribution of the polarizing group 73 on the surface of the core particle 71 may become non-uniform. In contrast, when the value of c is excessively small, introduction efficiency of the polarizing group 73 to the core particle 71 may be extremely decreased in a case where a substituent is introduced to the 2-position or the 6-position of the benzene ring. Therefore, the value of c is adjusted preferably in the range of 0 to 20 according to the kind or the position of the substituent introduced to the main skeleton.

Moreover, it is preferable for the polarizing group 73 to be introduced to the surface of the core particle 71 by a covalent bond. In this manner, the polarizing group 73 can be further and reliably prevented from being detached from the surface of the core particle 71. Accordingly, the charged state of the core particle 71 can be maintained for a long period of time.

It is preferable that the polarizing group 73 have a structure derived from a coupling agent bonded to the surface of the core particle 71 and the cyclic structure be connected to the surface of the core particle 71 through the structure derived from the coupling agent.

That is, as a method of introducing the polarizing group 73 (introduction method) to the surface of the core particle 71 by the covalent bond, a method of using a coupling agent is preferable. Examples of using a coupling agent include [A] a method of reacting a hydroxyl group existing on the surface of the core particle 71 and a coupling agent having a target polarizing group 73, and [B] a method of reacting a hydroxyl group existing on the surface of the core particle 71 and a coupling agent having a part of the target polarizing group 73, reacting a part of the introduced polarizing group 73 and a residue of the polarizing group 73, and completing the target polarizing group 73. According to the method of using a coupling agent, the polarizing group 73 can be easily and reliably introduced to the surface of the core particles 71 by the covalent bond.

Further, as the hydroxyl group present on the surface of the core particle 71, a hydroxyl group included in the core particle 71 or introduced by a hydrophilic treatment may be used. Examples of the hydrophilic treatment include a plasma treatment, a corona treatment, a surface treatment using a solvent, and a surface treatment using a surfactant.

Examples of the coupling agent to be used include a silane-based coupling agent, a titanium-based coupling agent, an aluminum-based coupling agent, a compound including a carboxylic acid terminal, and a compound including a phosphoric acid terminal, and particularly, a silane-based coupling agent is preferable.

Since a siloxane bond (siloxane network) is formed on the surface of the core particle 71 when a silane-based coupling agent is used, the polarizing group 73 can be strongly bonded to the surface of the core particle 71. Further, the silane-based coupling agent has advantages in that it is readily available, easy to be synthesized, and easy to be handled.

In addition, the method of introducing the polarizing group 73 to the surface of the core particle 71 is not particularly limited thereto. For example, in a case where another reactive functional group is present on the surface of the core particle 71 instead of a hydroxyl group, the polarizing group 73 can be introduced to the surface of the core particle 71 by reacting the reactive functional group and the compound having the polarizing group 73 as described above.

Further, when the amount of the polarizing group 73 to be introduced to the surface of the core particle 71 is represented by a ratio (% by weight) with respect to the total mass of the core particle 71 and the polarizing group 73, the introducing amount is preferably in the range of 0.1% by weight to 20% by weight, more preferably in the range of 0.1% by weight to 10% by weight, and still more preferably in the range of 0.1% by weight to 5% by weight. By adjusting the amount of the polarizing group 73 to be introduced to be within the above-described range, the charging state of the core particle 71 can be further reliably adjusted (controlled) to a desirably state.

Such a polarizing group 73 can be introduced to an area other than the area to which the above-described siloxane-based compound 72 is introduced among the surfaces of the core particles 71 and may be introduced to at least a part of the area. The introducing amount can be determined according to the target charging characteristic of the electrophoretic particles 70. That is, the amount of the polarizing group 73 to be introduced can be adjusted such that the electrophoretic particles 70 have a desired charging characteristic.

In addition, from a viewpoint of improving the dispersibility of the electrophoretic particles 70 in the dispersion medium 7, it is preferable that the total content of the siloxane-based compound 72 and the polarizing group 73 be in the range of 0.5 parts by mass to 10 parts by mass based on 100 parts by mass of the core particle 71 (mother particle).

Further, it is preferable that the occupancy rate of the area to which the polarizing group 73 is bonded to the surface of the core particle 71 be lower than the occupancy rate of the area to which the siloxane-based compound 72 is bonded to the surface of the core particle 71 described above. Accordingly, it is possible to prevent or suppress the polarizing group 73 from inhibiting the dispersibility generated due to the siloxane-based compound 72.

In addition, it is preferable that the molecular amount of the polarizing group 73 be smaller than that of the siloxane-based compound 72. Accordingly, it is possible to prevent or suppress the polarizing group 73 from inhibiting the dispersibility generated due to the siloxane-based compound 72. Further, since it is possible to adjust the occupancy rate of the area to which the siloxane-based compound 72 is bonded on the surface of the core particle 71 to be small, the area obtained by introducing the polarizing group to the surface of the mother particle can be sufficiently secured. Therefore, the control width of the charging property can be widened.

According to the electrophoretic particles 70 as described above, the dispersibility in the dispersion medium 7 can be improved by the siloxane-based compound 72 and the charging property can be applied by the polarizing group 73. In addition, the charging property of the electrophoretic particles 70 can be controlled by adjusting the kind or the amount of the polarizing group 73 to be introduced. Therefore, regardless of the kind of core particle 71, it is possible to exhibit the charging characteristics of desired polarity or the charging amount.

Moreover, according to the display sheet 21 using the dispersion liquid 100 which contains such electrophoretic particles 70 and the display device 20, a display with high contrast is possible.

Second Embodiment

Next, a second embodiment of a display device of the invention will be described.

Figure 8:
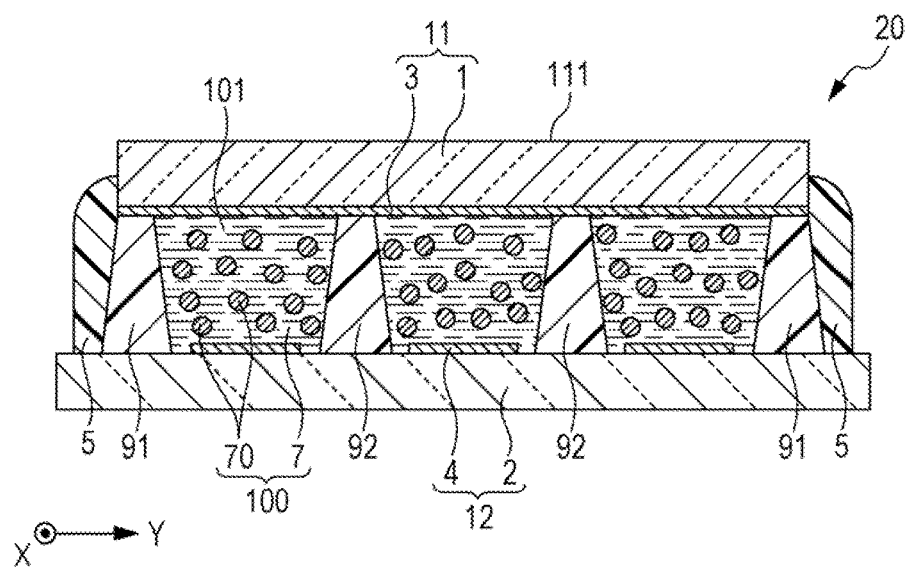
FIG. 8 is a cross-sectional view illustrating a second embodiment of a display device of the invention.

FIG. 8 is a cross-sectional view illustrating the second embodiment of the display device of the invention. In addition, hereinafter, for convenience of description, the upside is described as "up" and the downside is described as "down" in FIG. 8.

Hereinafter, the second embodiment will be described. The differences from the first embodiment will be mainly described below and the same description will not be repeated. Further, the same configurations as those of the first embodiment described above are denoted by the same reference numerals.

The display device 20 according to the second embodiment is the same as the display device 20 according to the first embodiment except that the display device 20 according to the first embodiment has a wall portion 92 in which a space 101 of the inside the wall portion 91 is more divided into plural sections.

That is, a plurality of the wall portions 92 are provided at predetermined intervals in the Y direction on the display layer 400. In addition, although not illustrated, a plurality of the wall portion are provided at predetermined intervals in the X direction on the display layer 400. Accordingly, divided pixel sections in a lattice shape are formed in the space 101.

Each pixel section is arranged so as to correspond to a second electrode 4 respectively. For this reason, it is possible to control the color of each pixel section and to freely generate an image which is visually recognized from a display surface 111 by appropriately controlling a voltage applied to the second electrode 4.

Such a wall portion 92 has the same structure as the above-described wall portion 91, but the average width of the wall portion 92 may be smaller than that of the wall portion 91. Consequently, the aperture ratio of the pixel can be improved.

The same actions and effects as those of the first embodiment can be obtained by the second embodiment.

Third Embodiment

Next, a third embodiment of a display device of the invention will be described.

Figure 9:
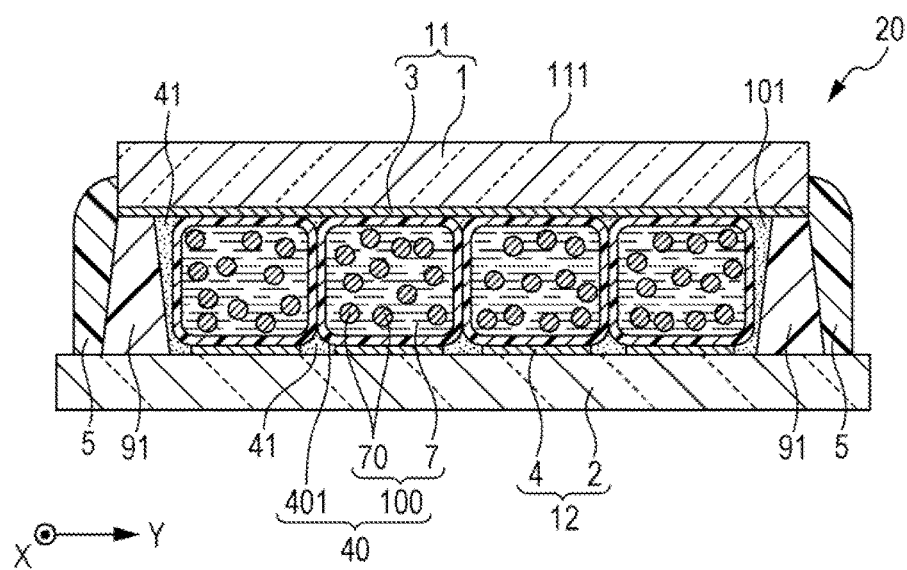
FIG. 9 is a cross-sectional view illustrating a display device of a third embodiment of the invention.

FIG. 9 is a cross-sectional view illustrating the display device of the third embodiment of the invention. In addition, hereinafter, for convenience of description, the upside is described as "up" and the down is described as "down" in FIG. 9.

Hereinafter, the third embodiment will be described. The differences from the first or second embodiment will be mainly described below and the same description will not be repeated. Further, the same configurations as those of the first embodiment described above are denoted by the same reference numerals.

The display device 20 according to the present embodiment is the same as that of the first embodiment except that a microcapsule 40 obtained by sealing a capsule main body (shell) 401 after putting a dispersion liquid 100 therein is provided.

That is, the display device 20 according to the present embodiment is formed by fixing (maintain) a plurality microcapsules 40 obtained by sealing the capsule main body 401 after placing the dispersion liquid 100 therein in the space 101 using a binder 41.

The microcapsule 40 is arranged so as to be spread in the X direction and the Y direction between substrates 11 and 12 with a single layer (each layer without overlapping each other in the thickness direction).

Examples of constituent materials of the capsule main body (shell) 401 include various resin materials such as gelatin, a composite material of arabic rubber and gelatin, a urethane-based resin, a melamine-based resin, a urea resin, an epoxy-based resin, a phenol-based resin, an acrylic resin, an olefin-based resin, polyamide, and polyether. These can be used as a combination of one or more kinds thereof.

In addition, the capsule main body 401 may be formed of a laminate having plural layers. In this case, as a constituent material of the innermost layer, an amino resin such as a melamine-based resin or a urea resin, or a composite resin of these is preferably used. In contrast, as a constituent material of the outermost layer, an epoxy-based resin is preferably used.

Further, the constituent material of the capsule main body 401 may be crosslinked (three-dimensionally crosslinked) by a crosslinking agent. In this manner, flexibility of the capsule main body 401 is maintained and the strength can be improved. As a result, it is possible to prevent the microcapsule 40 from being easily disintegrated.

The size of the microcapsules 40 is preferably substantially the same as each other. Accordingly, in the display device 20, generation of display unevenness is prevented or reduced so that more excellent display performance can be exhibited.

Further, it is preferable that the microcapsule 40 have a spherical shape so that the microcapsule 40 has excellent pressure resistance and bleed resistance. Therefore, when the display device 20 is operated in this manner or is stored, even in a case where impact is applied to the display device 20 or the display surface 111 is pressured, disintegration of the microcapsule 40 or scattering of the dispersion liquid 100 is prevented and the display device can be safely operated for a long period of time.

Moreover, the average particle size of the microcapsule 40 is preferably in the range of 5 μm to 50 μm and more preferably in the range of 10 μm to 30 μm. By adjusting the average particle size of the microcapsule 40 to be in the above-described range, electrophoresis of the electrophoretic particles 70 can be reliably controlled in the display device 20. That is, even when a pulse-like electric field is acted on the electrophoretic particles 70, it is possible to migrate to the end portion of the microcapsule 40 in a reliable manner. As a result, the contrast of a display can be improved.

The binder 41 is supplied for adhering the substrate 11 to the substrate 12, fixing the microcapsule 40 between the substrate 11 and the substrate 12, and securing the insulation property between a first electrode 3 and a second electrode 4. Accordingly, durability and reliability of the display device 20 can be further improved.

As the binder 41, a resin material (resin material in which only the insulation property or a microcurrent flows) having an excellent affinity (adhesiveness) for the substrate 11, the substrate 12, and the capsule main body 401 (microcapsule 40) and an excellent insulation property is preferably used.

Examples of the binder 41 include various resin materials such as polyethylene, polypropylene, a thermoplastic resin such as an ABS resin, a methacrylate resin, a methyl methacrylate resin, a vinyl chloride resin, or a cellulose resin, a silicone-based resin, and a urethane-based resin, and these can be used by combining one or more kinds thereof.

The display device 20 according to the present embodiment has the same actions and effects as those of the first and second embodiments.

Method of Producing Electrophoretic Particles

Next, a method of producing electrophoretic particles of the invention will be described.

Figure 12A:
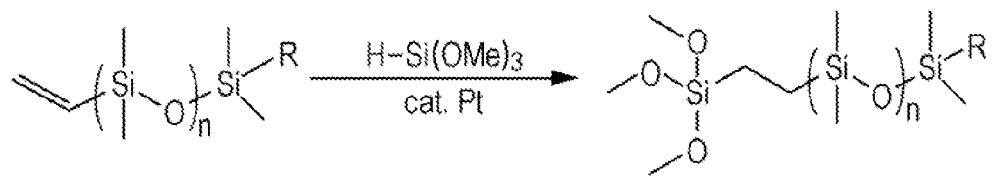
FIGS. 12A and 12B are views for describing an example of a method of producing a silicone-based compound of electrophoretic particles of the invention.
Figure 12B:
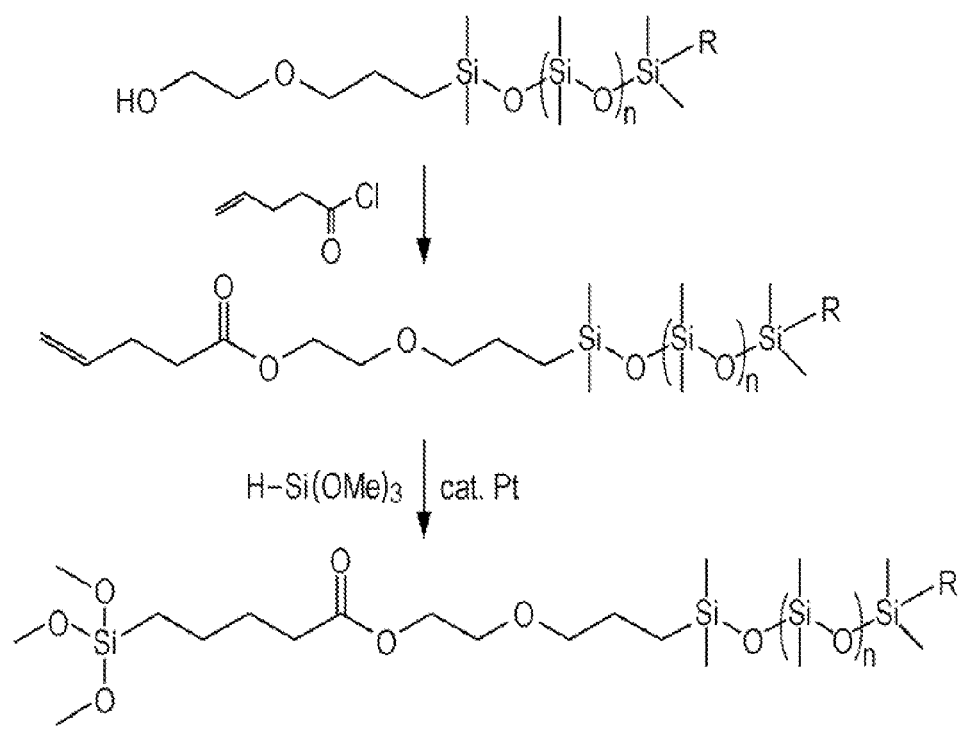

FIGS. 10A to 10C and 11A to 11D are views for describing an example of the method of producing electrophoretic particles of the invention. FIGS. 12A and 12B are views for describing an example of a method of producing a silicone-based compound of electrophoretic particles of the invention. FIGS. 13A and 13B are views for describing an example of a method of producing a polarizing group of electrophoretic particles of the invention. In addition, hereinafter, an example of a case of producing the above-described electrophoretic particles 70 will be described.

First, the whole method of producing the electrophoretic particles 70 will be simply described.

As described above, examples of the method of introducing the polarizing group 73 to the core particle 71 include [A] a method (hereinafter, also simply referred to as a "method [A]") of introducing the polarizing group 73 to the surface of the core particle 71 by reacting a coupling agent and the surface of the core particle 71 after synthesizing the coupling agent having the polarizing group 73 and [B] a method (hereinafter, also simply referred to as a "method [B]") of introducing a coupling agent containing a part of the polarizing group 73 to the surface of the core particle 71 and forming the polarizing group 73 by reacting the coupling agent and a compound having a residue of the polarizing group 73.

Therefore, the method of producing the electrophoretic particles 70 can be divided into a case of using the method [A] and a case of using the method [B] as the method of introducing the polarizing group 73 to the core particle 71.

In a case of introducing the polarizing group 73 to the surface of the core particle 71 using the method [A], examples of the method of producing the electrophoretic particles 70 include <a> a method of introducing the siloxane-based compound 72 after the polarizing group 73 is introduced to the surface of the core particle 71 (see FIG. 10A), (b) a method of introducing the polarizing group 73 after the siloxane-based compound 72 is introduced to the surface of the core particle 71 (see FIG. 10B), and (c) a method of introducing the siloxane-based compound 72 and the polarizing group 73 to the surface of the core particle 71 at the same time (see FIG. 10C) as shown in FIGS. 10A to 10C.

In contrast, in a case of introducing the polarizing group 73 to the surface of the core particle 71 using the method [B], examples of the method of producing the electrophoretic particles 70 include <d> a method of introducing a part of the polarizing group 73 to the surface of the core particle 71 to form a residue and then introducing the siloxane-based compound 72 (see FIG. 11A), <e> a method of introducing the siloxane-based compound 72 after a part of the polarizing group 73 is formed on the surface of the core particle 71 and then forming a residue of the polarizing group 73 (see FIG. 11B), <f> a method of introducing the siloxane-based compound 72 to the surface of the core particle 71 and then forming a residue by introducing a part of the polarizing group 73 (see FIG. 11C), and <g> a method of introducing the siloxane-based compound 72 and a part of the polarizing group 73 to the surface of the core particle 71 at the same time and then forming a residue of the polarizing group 73 (see FIG. 11D) as shown in FIGS. 11A to 11D.

Hereinafter, the introducing method of the siloxane-based compound 72 to the surface of the core particle 71 and the introducing method of the polarizing group 73 to the surface of the core particle 71, which are used for the producing method, will be described in detail in this order.

Introduction of Siloxane-Based Compound to Surface of Core Particle

Hereinafter, the method of introducing the siloxane-based compound 72 to the surface of the core particle 71 will be described.

The method of introducing the siloxane-based compound 72 to the surface of the core particle 71 has a process of reacting a siloxane bond-containing substance and a coupling agent to obtain a reactant and a process of reacting a hydrolysable group derived from the coupling agent of the reactant with respect to the surface of the core particle 71 to bond the siloxane-based compound derived from the reactant to a part of the surface. Hereinafter, each process will be described.

1

First, the siloxane bond-containing substance is reacted with the coupling agent. Accordingly, the coupling agent containing the structure of the siloxane-based compound 72 can be obtained as the reactant. In addition, the reaction can be performed by reacting a reactive functional group contained in the siloxane bond-containing substance with a reactive functional group contained in the coupling agent. In this manner, the siloxane bond-containing substance is reformed to the coupling agent and the hydrolysable group derived from the coupling agent is positioned at one terminal of the obtained reactant.

The reaction of the siloxane bond-containing substance with the coupling agent can be performed by adding a sufficient amount of the coupling agent containing a reactive functional group to the siloxane bond-containing substance containing a reactive functional group. Accordingly, the reaction probability between the siloxane bond-containing substance and the coupling agent can be improved and the yield of the reactant 72A can be particularly improved.

As the siloxane bond-containing substance, silicone oil, organopolysiloxane, or a modified material of these can be exemplified, and a modified material of silicone oil is particularly preferably used.

The modified silicone oil is not particularly limited as long as a reactive functional group such as an amino group, an epoxy group, a carboxyl group, a hydroxyl group, a mercapto group, an isocyanate group, a carbinol group, or an acid chloride is contained. Specific examples thereof include amino-modified silicone oil, epoxy-modified silicone oil, carboxyl-modified silicone oil, and carbinol-modified silicone oil.

In addition, the silicone oil may contain two or more kinds of the above-described reactive functional groups.

On the other hand, the coupling agent is not particularly limited as long as a reactive functional group such as an amino group, an epoxy group, a sulfide group, a vinyl group, an acryloxy group, a methacryloxy group, or a mercapto group is contained. Specific examples include a silane-based coupling agent and a titanium-based coupling agent.

In addition, the coupling agent may contain two or more kinds of the above-described reactive functional groups.

Further, it is preferable that the amount of the coupling agent to be added be set to an amount containing one equivalent or more of a reactive functional group and it is more preferable that the amount of the coupling agent to be added to be set to an amount containing 1.5 equivalent or more of a reactive functional group with respect to the reactive functional group in the siloxane bond-containing substance.

FIGS. 12A and 12B illustrate an example of a reaction formula showing a reaction path of the modified silicone oil and the coupling agent.

The reaction shown in FIG. 12A is a hydrosilylation reaction of applying a Si—H bond to an organic double bond such as C═C. A metal complex or the like of Groups 8 to 10 of the Periodic Table is used as a catalyst and platinum or a compound thereof is particularly preferably used.

Further, as shown in FIG. 12B, first, a portion connected to the modified silicone oil is reacted and then a coupling agent is further reacted with respect to the obtained reactant to finally obtain a reactant if necessary. At this time, as the connected portion, for example, 10-undecenoyl chloride, 10-undecenoic acid, or 4-pentenoic acid can be used in addition to 4-pentenoyl chloride shown in FIG. 12B. By using such a method, it is possible to finely adjust the molecular amount and achieve both a hydrophilic property and a hydrophobic property of a molecule of the siloxane-based compound 72.

The reaction can be performed at a temperature of 0° C. to 70° C. for 30 minutes to 6 hours when an acid chloride is used.

Next, the core particle 71 is added to a liquid containing the reactant obtained in [1] described above. In this manner, the hydrolysable group derived from the coupling agent in the reactant is reacted with the functional group on the surface of the core particle 71. As a result, the siloxane-based compound 72 can be introduced to the surface of the core particle 71.

According to the above-described method of introducing the siloxane-based compound 72 to the surface of the core particle 71, a process of reacting the siloxane bond-containing substance with the coupling agent in advance to obtain the reactant and reacting the reactant 72A to the surface of the core particle 71 is carried out, so the reaction probability can be increased because the reaction opportunities between the siloxane bond-containing substance and the coupling agent can be sufficiently secured at the time when the reactant is generated as described above. As a result, the yield of the reactant can be increased.

In contrast, in a case where a process of introducing the coupling agent to the core particle to be reformed, adding the siloxane bond-containing substance thereto, and reacting the siloxane bond-containing substance with the coupling agent is carried out, it is difficult to control the reaction frequency of the reactive functional group of the coupling agent introduced to the core particle and the reactive functional group of the siloxane bond-containing substance, and thus the amount of the siloxane-based compound 72 to be introduced may not be precisely adjusted. Particularly, since the siloxane bond-containing substance has a linear molecular structure with a long chain shape, the probability of reacting the reactive functional group with other functional groups tends to be decreased, so it is necessary to introduce a large amount of coupling agent to the core particle as much as possible in advance to compensate for the reduced probability. As a result, charging characteristics derived from the core particle are eliminated by the large amount of coupling agent. Therefore, both of the dispersibility and the charging characteristics may not be sufficiently achieved only by introducing the siloxane-based compound.

In contrast, in the present producing method, the amount of the obtained reactant to be introduced with respect to the core particle 71 can be easily controlled by reacting the siloxane bond-containing substance with the coupling agent in advance in a reliable manner. The reason for this is that the reaction probability with the surface of the core particle 71 can be easily increased because the hydrolysable group derived from the coupling agent is multifunctional, and the amount of the siloxane-based compound 72 to be introduced to the core particle 71 is easily and precisely adjusted by reacting the reactant having an amount corresponding to the amount of the siloxane-based compound 72 to be introduced with respect to the surface of the core particle 71.

Hereinbefore, the method of introducing the siloxane-based compound 72 to the surface of the core particle 71 has been described.

Introduction of Polarizing Group to Surface of Core Particle

Hereinafter, the method of introducing the polarizing group 73 to the surface of the core particle 71 will be described.

Method A

Hereinafter, the method [A], that is, the method of introducing the polarizing group 73 to the surface of the core particle 71 by reacting a coupling agent 73A with the surface of the core particle 71 after the coupling agent 73A including the polarizing group 73 is synthesized will be described.

A1

First, the coupling agent 73A including the polarizing group 73 is synthesized.

Specifically, a cyclic structure-containing substance having a part (part of the cyclic structure to which a substituent is bonded) of the polarizing group 73 is reacted with a coupling agent having a residue (spacer portion) of the polarizing group 73. In this manner, the coupling agent 73A having a structure of the polarizing group 73 can be obtained as a reactant. Further, the reaction is performed by reacting a reactive functional group contained in the cyclic structure-containing substance with a reactive functional group contained in the coupling agent. Accordingly, the cyclic structure-containing substance is reformed by the coupling agent, and a hydrolysable group derived from the coupling agent is positioned on the terminal of the obtained reactant.

The reaction of the cyclic structure-containing substance with the coupling agent, for example, can be performed by adding a sufficient amount of coupling agent containing a reactive functional group with respect to the cyclic structure-containing substance containing a reactive functional group. Accordingly, the reaction probability of the cyclic structure-containing substance and the coupling agent can be increased and the yield of the reactant can be particularly improved.

The cyclic structure-containing substance is not particularly limited as long as the substance includes a part of the cyclic structure to which the above-described substituent (an electron attracting group or an electron donating group) is bonded and a reactive functional group which can be reacted with the coupling agent. The reactive functional group is not particularly limited as long as a reactive functional group such as an amino group, an epoxy group, a carboxyl group, a hydroxyl group, a mercapto group, an isocyanate group, a carbinol group, or an acid chloride is included. As specific examples of the cyclic structure-containing substance having a carboxyl group as a reactive functional group, carboxylic acid represented by the following formulae (a-1) to (a-7) can be exemplified.

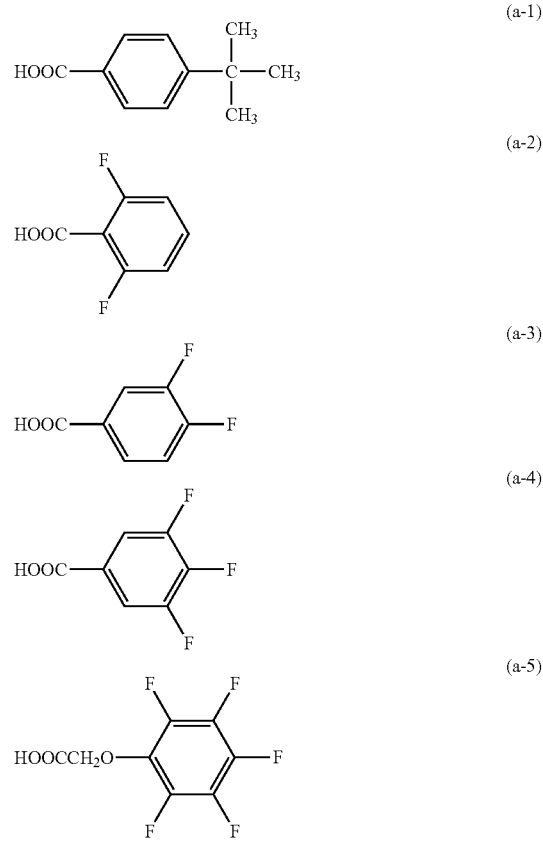

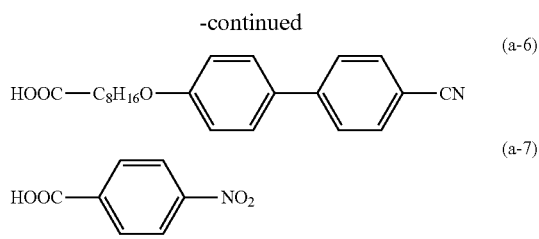

The coupling agent containing a residue (spacer portion) of the polarizing group 73 is not particularly limited as long as a reactive functional group such as an amino group, an epoxy group, a sulfide group, a vinyl group, an acryloxy group, a methacryloxy group, or a mercapto group is included. Specific examples thereof include a silane coupling agent and a titanium coupling agent.

In addition, the coupling agent may contain two or more kinds of the above-described reactive functional groups.

Further, it is preferable that the amount of the coupling agent to be added be set to an amount containing one equivalent or more of a reactive functional group and it is more preferable that the amount of the coupling agent to be added to be set to an amount containing 1.5 equivalent or more of a reactive functional group with respect to the reactive functional group in the cyclic structure-containing substance.

FIG. 13A illustrates an example of a case using an aromatic carboxylic acid as a cyclic structure-containing substance and using a silane coupling agent as a coupling agent.
A2

Next, the core particle 71 is added to a liquid containing the reactant (coupling agent 73A containing the polarizing group 73) obtained in the above-described process [A1]. In this manner, a hydrolysable group derived from the coupling agent in the reactant is reacted with a functional group on the surface of the core particle 71. As a result, the polarizing group 73 can be introduced to the surface of the core particle 71.

In the method [A] of introducing the polarizing group 73 to the surface of the core particle 71 as described above, the process [A2] can be performed before the process [2] or after the process [2] in the method of introducing the siloxane-based compound 72 to the surface of the core particle 71 described above and at the same time with the process [2].

That is, the method <a> of producing the electrophoretic particles 70 shown in FIG. 10A can be implemented by performing the process [A2] before the process [2]. In addition, the method <b> of producing the electrophoretic particles 70 shown in FIG. 10B can be implemented by performing the process [A2] after the process [2]. Further, the method <c> of producing the electrophoretic particles 70 shown in FIG. 10C can be implemented by performing the process [A2] at the same time with the process [2].
Method B Next, the method [B], that is, a method of introducing a coupling agent containing a part of the polarizing group 73 to the surface of the core particle 71 and then forming the polarizing group 73 by reacting the coupling agent with the compound having a residue of the polarizing group 73 will be described.
B1

First, the core particle 71 is added to a liquid containing the coupling agent 732A having a part of the structure (spacer portion) of the polarizing group 73. In this manner, the hydrolysable group of the coupling agent is reacted with a functional group on the surface of the core particle 71. As a result, a part of a structure 732 of the polarizing group 73 can be introduced to the surface of the core particle 71.

The coupling agent 732A containing a part (spacer portion) of the polarizing group 73 is the same as that of the process [A1] of the above-described method [A], and is not particularly limited as long as the coupling agent 732A contains a reactive functional group such as an amino group, an epoxy group, a sulfide group, a vinyl group, an acryloxy group, a methacryloxy group, or a mercapto group. Specific examples thereof include a silane coupling agent and titanium coupling agent.

FIG. 13B illustrates an example of a case using an aromatic carboxylic acid as a cyclic structure-containing substance and using a silane coupling agent as a coupling agent.
B2

Next, the structure 732 bonded to the surface of the core particle 71 is reacted with the cyclic structure-containing substance 731A containing a structure (portion of the cyclic structure to which a substituent is bonded) of a residue of the polarizing group 73. In this manner, the polarizing group 73 bonded to the surface of the core particle 71 can be obtained. In addition, the reaction can be performed by reacting the reactive functional group contained in the cyclic structure-containing substance with the reactive functional group contained in the structure 732.

Moreover, the reaction of the cyclic structure-containing substance with the structure 732 can be performed in the same manner as that of the process [A1] of the above-described method [A].

The cyclic structure-containing substance is the same as the cyclic structure-containing substance in the process [A1] of the above-described method [A] and is not particularly limited as long as the cyclic structure-containing substance has a reactive functional group obtained by reacting a part of the cyclic structure to which the above-described substituent (an electron attracting group or an electron donating group) is bonded with the structure 732.

In the method [B] of introducing the polarizing group 73 to the surface of the core particle 71 as described above, the process [B1] can be performed before the process [2], at the same time with the process [2], or after the process [2] in the above-described method of introducing the siloxane-based compound 72 to the surface of the core particle 71. In a case of performing the process [B1] before the process [2], the process [B2] can be performed before or after the process [2]

That is, the method <d> of producing the electrophoretic particles 70 shown in FIG. 11A can be implemented by performing the processes [B1] and [B2] before the process [2]. In addition, the method <e> of producing electrophoretic particles 70 shown in FIG. 11B can be implemented by performing the process [B1] before the process [2] and the process [B2] after the process [2]. Further, the method <f> of producing the electrophoretic particles 70 shown in FIG. 11C can be implemented by performing the process [B1] after the process [2]. Further, the method <g> of producing the electrophoretic particles 70 shown in FIG. 11D can be implemented by performing the process [B1] at the same time with the process [2].
Electronic Equipment The display device 20 described above can be installed on various electronic equipment. Specific examples of the electronic equipment include electronic paper, an e-book, a TV, a view finder type or a direct-view monitor type of video tape recorder, a car navigation device, a pager, an electronic organizer, a calculator, electronic newspaper, word processors, a personal computer, a workstation, a video phone, a POS terminal, and equipment with a touch panel.

Electronic equipment will be described in detail with an example of electronic paper from among these.

Figure 14:
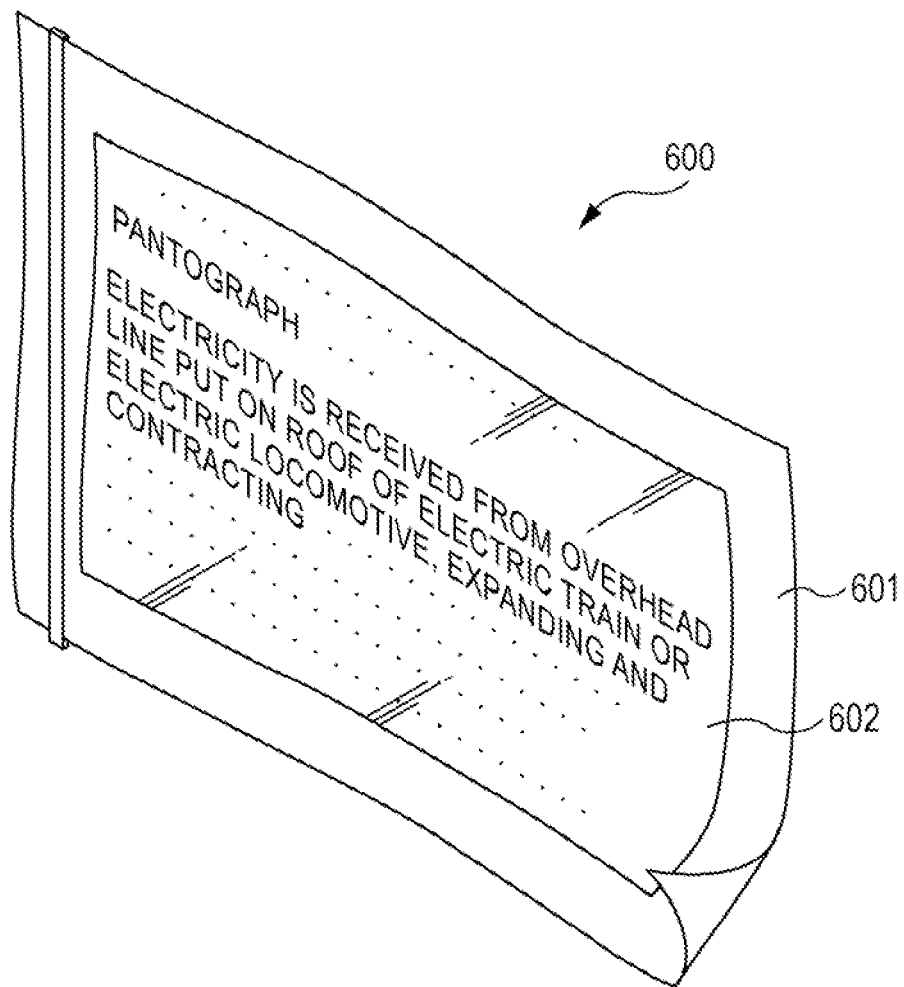
FIG. 14 is a perspective view illustrating an embodiment in a case where electronic equipment of the invention is applied to electronic paper.

FIG. 14 is a perpendicular view illustrating an embodiment in a case where the electronic equipment of the invention is applied to electronic paper.

Electronic paper 600 shown in FIG. 14 includes a main body 601 formed of a rewritable sheet which has flexibility and the same texture as that of paper, and a display unit 602. In such electronic paper 600, the display unit 602 includes the display device 20 described above.

Next, an embodiment of a case where the electronic equipment of the invention is applied to a display will be described.

Figure 15A:
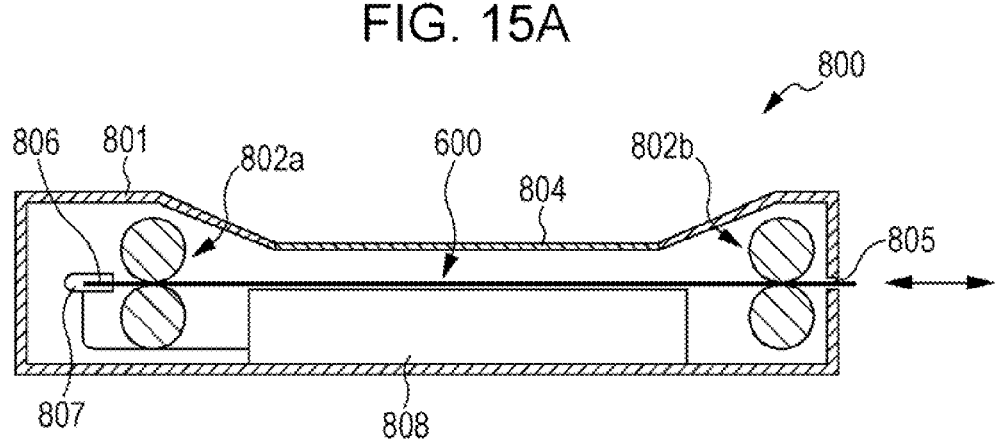
FIGS. 15A and 15B are views illustrating an embodiment in a case where electronic equipment of the invention is applied to a display.
Figure 15B:
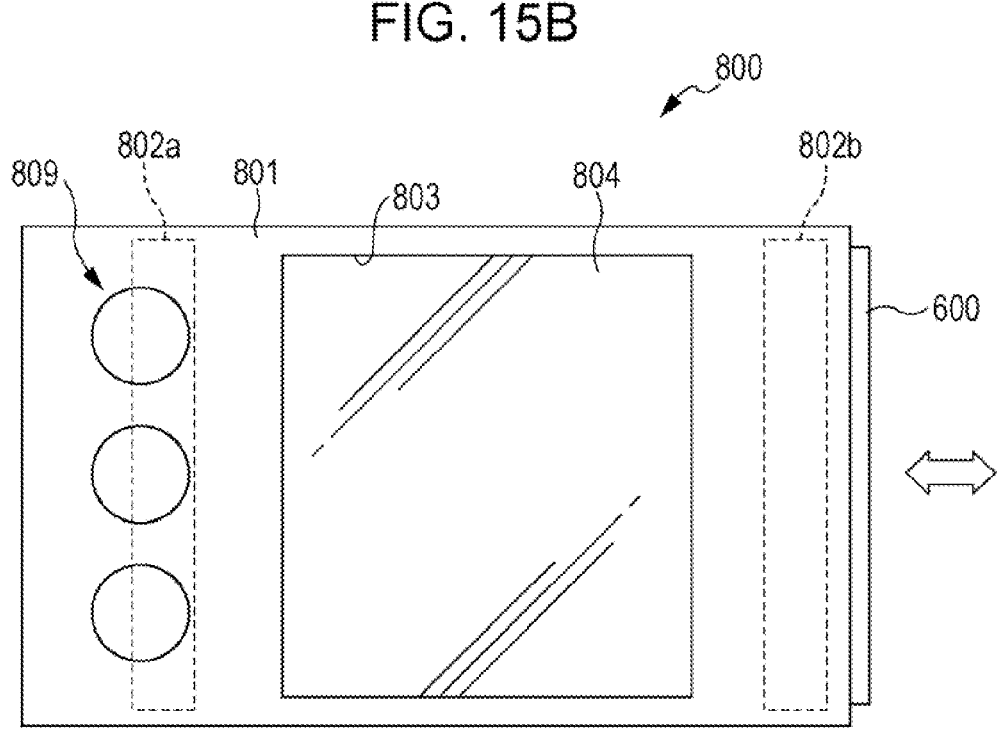

FIGS. 15A and 15B are views illustrating an embodiment of a case where the electronic equipment is applied to a display. Here, FIG. 15A is a cross-sectional view and 15B is a plan view.

A display (display device) 800 shown in FIGS. 15A and 15B includes a main body 801, and electronic paper 600 detachably provided with respect to the main body 801. In addition, the electronic paper 600 has the configuration as described above, that is, the same configuration shown in FIGS. 10A to 10C.

In the main body 801, an insertion opening 805 into which the electronic paper 600 can be inserted on the side portion thereof (right side in FIG. 15A) and two sets of conveying roller pairs 802a and 802b are provided therein. When the electronic paper 600 is inserted into the main body 801 through the insertion opening 805, the electronic paper 600 is arranged on the main body 801 in a state of being interposed between the conveying roller pairs 802a and 802b.

In addition, a rectangular hole portion 803 is formed on the display surface side (front side of the paper surface in FIG. 15B) of the main body 801 and a transparent glass plate 804 is fitted in the hole portion 803. In this manner, the electronic paper 600 in a state of being disposed on the main body 801 can be visually recognized from the outside of the main body 801. That is, in the display 800, the display surface is formed by visually recognizing the electronic paper 600 in a state of being disposed on the main body 801 in the transparent glass plate 804.

Further, a terminal portion 806 is provided on the distal portion of the electronic paper 600 in the insertion direction (left side in FIG. 15A) and a socket 807 is to which the terminal portion 806 is connected in a state in which the electronic paper 600 is disposed on the main body 801 in the main body 801. A controller 808 and an operation unit 809 are electrically connected to the socket 807.

In such a display 800, the electronic paper 600 is detachably disposed on the main body 801 and can be carried in a state of being detached from the main body 801 for use. Accordingly, convenience is improved.

Hereinbefore, the electrophoretic particles, the electrophoretic dispersion liquid, the display device, and the electronic equipment of the invention have been described based on the embodiments shown in figures, but the invention is not limited thereto, and the configurations of the respective units can be substituted with optional configurations having the same functions. Further, another optional component may be added to the invention. Furthermore, each embodiment may be appropriated incorporated.

EXAMPLES

Next, examples of the invention will be described in detail.

1. Production of Electrophoretic Particles

Electrophoretic particles were produced as follows. In addition, conditions of producing electrophoretic particles in each reference example, each example, and each comparative example are listed in Table 1.

Reference Example 1

[1] First, silicone oil represented by the following formula (3), a silane coupling agent containing a reactive functional group having one or more equivalents with respect to a reactive functional group derived from silicone oil contained therein, and toluene were mixed together in a round-bottomed flask, and then a platinum catalyst was added thereto. The mixture was stirred and left as it was in a state of being heated. Subsequently, the resultant was cooled to room temperature, the solvent was removed under the reduced pressure, and then the residue was dried. In this manner, a reactant (coupling agent containing a structure of a siloxane-based compound) of the modified silicone oil and the silane coupling agent represented by the following formula (4) was obtained.

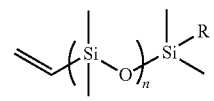

(3)

[in the formula (3), n represents an integer of 50 to 500. In addition, R represents an alkyl group (butyl group).]

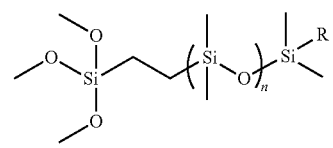

(4)

[in the formula (4), n represents an integer of 50 to 500. In addition, R represents an alkyl group (butyl group).]

[2] Next, 0.01 g of the obtained reactant and 2.0 g of titanium oxide particles ("CR-97" (trade name), manufactured by ISHIHARA SANGYO KAISHA, LTD.) having an average particle size of 250 nm were mixed with toluene, and the mixture was heated and refluxed. Subsequently, toluene was distilled, thereby obtaining electrophoretic particles.

Reference Example 2

[1] First, modified silicone oil represented by the following formula (1), triethylamine, and dichloromethane were mixed together in a round-bottomed flask and the mixture was stirred.

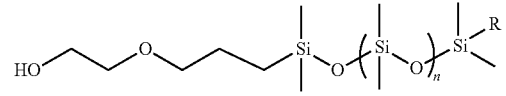

(1)

[in the formula (1), n represents an integer of 50 to 300. In addition, R represents an alkyl group (butyl group).]

[2] Next, 4-pentenoyl chloride was added dropwise to the obtained mixture, and the mixture was stirred for 2 hours.

[3] After dichloromethane was distilled, hexane was added thereto. In addition, the deposited solid was filtered by separation, and a solvent was volatilized and removed from the liquid, thereby obtaining a reactant of modified silicone oil and 4-pentenoyl chloride.

[4] Next, the obtained reactant, a silane coupling agent containing a reactive functional group having one or more equivalents with respect to a reactive functional group derived from modified silicone oil contained therein, and toluene were mixed together in a round-bottomed flask, and then a platinum catalyst was added thereto. The mixture was stirred and left as it is in a state of being heated. Subsequently, the resultant was cooled to room temperature, the solvent was removed under the reduced pressure, and then the residue was dried. In this manner, a reactant of a compound in which a graft chain was introduced to the modified silicone oil and the silane coupling agent represented by the following formula (2) was obtained.

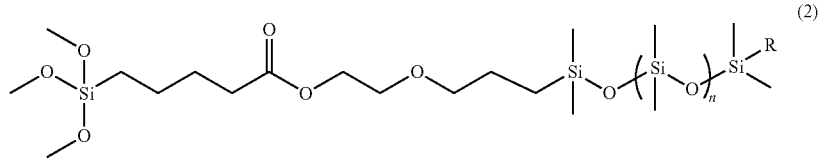

(2)

[in the formula (2), n represents an integer of 50 to 300. In addition, R represents an alkyl group (butyl group).]

[5] Next, 0.05 g of the obtained reactant and 2.0 g of titanium oxide particles ("CR-97" (trade name), manufactured by ISHIHARA SANGYO KAISHA, LTD.) having an average particle size of 250 nm were mixed with toluene, and the mixture was heated and refluxed. Subsequently, toluene was distilled, thereby obtaining electrophoretic particles.

Reference Example 3

First, 0.08 g of modified silicone oil represented by the following formula (5) and 2.0 g of titanium oxide particles ("CR-97" (trade name), manufactured by ISHIHARA SANGYO KAISHA, LTD.) having an average particle size of 250 nm were mixed with toluene in a round-bottomed flask, and the mixture was heated and refluxed. Subsequently, toluene was distilled, thereby obtaining electrophoretic particles.

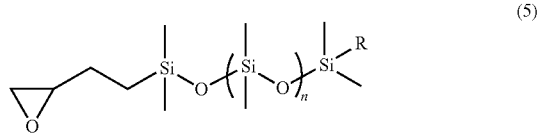

(5)

[in the formula (5), n represents an integer of 50 to 100. In addition, R represents an alkyl group (butyl group).]

Reference Examples 4 to 7

Electrophoretic particles were obtained in the same manner as that of Reference Example 2 except that the occupancy rate of the area to which the siloxane-based compound was bonded to the surface of the core particle was set to the value listed in Table 1.

Example 1

Electrophoretic particles were obtained in the same manner as that of Reference Example 2 except that the polarizing group was introduced to the surface of the titanium oxide particle in addition to the siloxane-based compound.

Specifically, the siloxane-based compound and the polarizing group were introduced to the surface of the titanium oxide particle as described below.

First, carboxylic acid represented by the following formula (6), 3-aminopropyltrimethoxysilane (silane coupling agent), 1-ethyl-3-(3-dimethylaminopropyl)-carbodiimide hydrochloride (EDC) as a condensing agent for forming an amide bond, 4-(dimethylamine)pyridine (DMAP), and anhydrous methylene chloride were mixed together and then the amino group and the carboxylic acid were condensed.

(6)

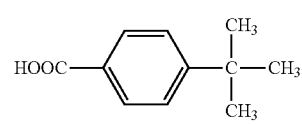

Next, the obtained reactant, 0.05 g of the reactant obtained in [4] of Reference Example 1 described above and 2.0 g of titanium oxide particles ("CR-97" (trade name), manufactured by ISHIHARA SANGYO KAISHA, LTD.) having an average particle size of 250 nm were mixed with toluene in a round-bottomed flask, and the mixture was heated and refluxed. Subsequently, toluene was distilled, thereby obtaining electrophoretic particles.

Examples 2 to 7

Electrophoretic particles were obtained in the same manner as that of Example 1 described above except that carboxylic acids represented by the following formulae (7) to (12) were used instead of carboxylic acid represented by the formula (6) above.

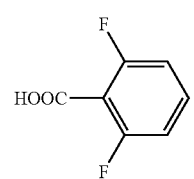

(7)

-continued

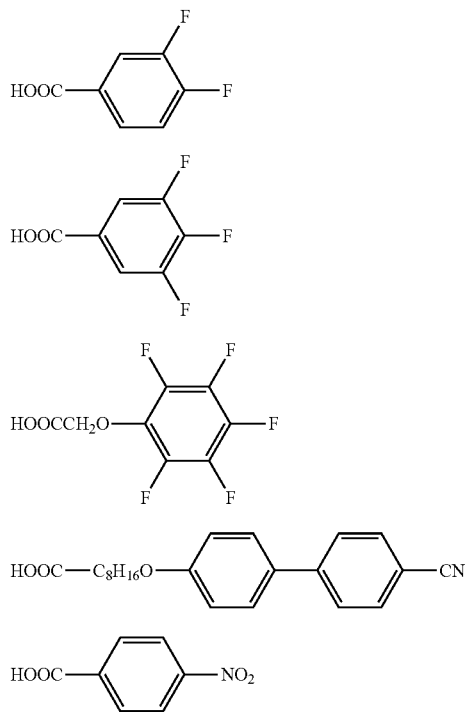

Comparative Example 1

First, 0.3 g of an epoxy-modified coupling agent (γ-glycidoxypropyltrimethoxysilane) and 3.0 g of titanium oxide particles ("CR-97" (trade name), manufactured by ISHIHARA SANGYO KAISHA, LTD.) having an average particle size of 250 nm were mixed with toluene in a round-bottomed flask and the mixture was heated and reacted while a dispersion treatment was fully performed. After the reaction was completed, the resultant was allowed to be naturally cooled to cool the content in the flask, and then toluene was distilled, thereby obtaining electrophoretic particles.

Comparative Example 2

Electrophoretic particles were obtained in the same manner as that of Comparative Example 1 except that a mercapto-modified coupling agent was used as a silane coupling agent.

Comparative Example 3

Titanium oxide particles ("CR-97" (trade name), manufactured by ISHIHARA SANGYO KAISHA, LTD.) having an average particle size of 250 nm were used as electrophoretic particles.

Comparative Example 4

Electrophoretic particles were obtained in the same manner as that of Reference Example 3 except that the film of silicone oil was formed by an excessive amount of modified silicone oil represented by the formula (5) above coated on the surface of the titanium oxide particle.

Comparative Example 5

Electrophoretic particles were obtained in the same manner as that of Example 1 except that only the polarizing group was introduced to the surface of the titanium oxide particle without introducing the siloxane-based compound.

Specifically, electrophoretic particles were obtained as described below.

<1> 2.0 g of titanium oxide particles ("CR-97" (trade name), manufactured by ISHIHARA SANGYO KAISHA, LTD.) having an average particle size of 250 nm and carboxylic acid represented by the formula (6) above were mixed with toluene in a round-bottomed flask, the mixture was stirred and irradiated with ultrasonic waves, and then heated and stirred. In this manner, the carboxylic acid was adsorbed to the surface of the titanium oxide particle and then dispersed into toluene.

<2> Next, 3-aminopropyltrimethoxysilane (silane coupling agent) was mixed with the dispersion liquid, and the solution was heated and refluxed. Subsequently, toluene was distilled to obtain powder.

<3> 1-ethyl-3-(3-dimethylaminopropyl)-carbodiimidehydrochloride (EDC) as a condensing agent for forming an amide bond, 4-(dimethylamine)pyridine (DMAP), and anhydrous methylene chloride were mixed with the obtained powder and then the amino group and the carboxylic acid were condensed.

<4> Next, the powder was recovered by filtration, was washed with chloroform and water, and then heated, thereby completing a siloxane network. In this manner, titanium oxide particles (hereinafter, referred to as "surface modified particles") to which a target organic group was introduced were obtained.

In addition, generation of an amide bond was verified by verifying a peak of stretching vibration of C=O of an amino bond in vicinity of 1643 cm$^{-1}$ by IR measurement.

The amount of the organic group to be introduced was 0.8% and the zeta potential of the surface modified particle was +50.7 mV.

2. Evaluation of Electrophoretic Particles

First, an electrophoretic dispersion liquid was prepared by dispersing the electrophoretic particles obtained in respective Reference Examples, respective Examples, and respective Comparative Examples into dimethyl silicone oil in which anthraquinone blue (dye) was dissolved such that the ratio of the electrophoretic particles became 10% by mass. In addition, the dielectric constant of the used dimethyl silicone oil was substantially 2.72.

Next, an electrophoretic display device as shown in FIG. 1 was produced using the electrophoretic dispersion liquid. The specifications of the respective units are as follows.

Base portion 1 and base portion 2
Size: length 50 mm×width 50 mm×thickness 100 μm
Constituent material: polyethylene
First electrode 3 and second electrode 4 (in addition, the second electrode is not divided)
Size: length 40 mm×width 40 mm×thickness 4
Constituent material: ITO
Spacer
Size: width 5 mm×height 50 μm
Constituent material: epoxy resin Further, a dispersant was further added to the electrophoretic dispersion liquid obtained by using the electrophoretic particles obtained in Comparative Example 2. The concentration of the dispersant was 0.4% by mass with respect to the silicone oil. In addition, as the dispersant, a polymer dispersant (SOLSPERSE 18000 (trade name) manufactured by Lubrizol Corporation) was used.

2.1 Evaluation of Dispersibility (Reflectance)

A predetermined voltage was applied to the obtained respective electrophoretic display devices such that electrophoretic particles were collected to the first electrode side.

As a result, a white color was displayed on the display surface. The white display was derived from titanium oxide and an excellent white color with high reflectance was displayed by dispersing the electrophoretic particles as uniform as possible without aggregation.

The dispersibility of the electrophoretic particles were evaluated by measuring the reflectance of the white-color display. In addition, the evaluation was performed based on the following evaluation criteria.

Evaluation Criteria of Dispersibility
A: The dispersibility was excellent (high reflectance).
B: The dispersibility was slightly excellent (slightly high reflectance).
C: The dispersibility was not excellent (low reflectance).

2.2 Evaluation of Charging Characteristics (Mobility)

A predetermined voltage was applied to the respective electrophoretic display devices obtained in respective Reference Examples, and respective Comparative Examples such that the electrophoretic particles were collected to the first electrode side.

As a result, a white color was displayed on the display surface.

Next, a predetermined voltage was applied thereto such that the electrophoretic particles were collected to the second electrode side. In this manner, the electrophoretic particles collected in the first electrode side were moved to the second electrode side. At this time, the mobility of the electrophoretic particles can be measured by measuring the time necessary to move predetermined distance. Therefore, the charging characteristics of the electrophoretic particles were evaluated by measuring the mobility. Further, the evaluation was performed based on the following evaluation criteria.

Evaluation Criteria of Charging Characteristics
A: The charging amount was large (high mobility).
B: The charging amount was slightly large (slightly high mobility).
C: The charging amount was small (lower mobility).

In addition, the zeta potentials of the electrophoretic particles of Examples 1 to 7 were measured.

2.3 Evaluation of Resistivity

The volume resistivity between electrodes was measured by applying a voltage to between the first electrode and the second electrode of the obtained each electrophoretic display device.

2.4 Evaluation of Display Unevenness

Display unevenness in the respective electrophoretic display devices obtained in respective Reference Examples and respective Comparative Examples was evaluated. The evaluation was performed based on the following evaluation criteria. In addition, the "display unevenness" here corresponds to the time lag from the start of the movement to the completion of the white display when a non-white display state is moved to the white display state.

Evaluation Criteria of Display Unevenness
AA: Display unevenness was extremely few (extremely short time lag)
A: Display unevenness was few (short time lag)
B: Display unevenness was frequent (long time lag)
C: Display unevenness was extremely frequent (extremely long time lag)

The above-described evaluation results are listed in Tables 1 and 2.

TABLE 1

| | | | Reference Example 1 | Reference Example 2 | Reference Example 3 | Reference Example 4 | Reference Example 5 | Reference Example 6 |
|---|---|---|---|---|---|---|---|---|
| Electrophoretic particles | Core particle | — | $TiO_2$ | $TiO_2$ | $TiO_2$ | $TiO_2$ | $TiO_2$ | $TiO_2$ |
| | Occupancy rate of siloxane-based compound | % | 0.1 | 0.9 | 0.7 | 0.03 | 2.5 | 4.3 |
| | Siloxane bond-containing substance | — | Formula (3) | Formula (1) | Formula (4) | Formula (1) | Formula (1) | Formula (1) |
| | Coupling agent | — | Formula (2) | Formula (2) | — | Formula (2) | Formula (2) | Formula (2) |
| | Connected portion | — | — | 4-pentenoyl chloride | — | 4-pentenoyl chloride | 4-pentenoyl chloride | 4-pentenoyl chloride |
| Dispersion liquid | Dispersion medium | — | Dimethyl silicone oil | | | | | |
| | Dispersant | % by mass | — | — | — | — | — | — |
| Evaluation results | Dispersibility (reflectance) | — | A | A | A | B | A | A |
| | Charging characteristics (mobility) | — | A | A | A | A | A | A |
| | Volume resistivity | $\Omega \cdot m$ | $1 \times 10^{15}$ or more | $1 \times 10^{15}$ or more | $1 \times 10^{15}$ or more | $1 \times 10^{15}$ or more | $1 \times 10^{15}$ or more | $1 \times 10^{15}$ or more |
| | Presence of display unevenness | — | A | AA | B | A | AA | AA |

TABLE 1-continued

| | | | Reference Example 7 | Comparative Example 1 | Comparative Example 2 | Comparative Example 3 | Comparative Example 4 |
|---|---|---|---|---|---|---|---|
| Electrophoretic particles | Core particle | — | TiO$_2$ | TiO$_2$ | TiO$_2$ | TiO$_2$ | TiO$_2$ |
| | Occupancy rate of siloxane-based compound | % | 12.3 | (32.1) | (15.4) | 0 | Substantially entire surface |
| | Siloxane bond-containing substance | — | Formula (1) | — | — | — | Formula (4) |
| | Coupling agent | — | Formula (2) | Epoxy modification | Mercapto modification | — | |
| | Connected portion | — | 4-pentenoyl chloride | | | | |
| Dispersion liquid | Dispersion medium | — | | | Dimethyl silicone oil | | |
| | Dispersant | % by mass | — | — | — | 0.4 | |
| Evaluation results | Dispersibility (reflectance) | — | A | B | B | C | A |
| | Charging characteristics (mobility) | — | B | C | C | A | C |
| | Volume resistivity | Ω · m | 1 × 10$^{15}$ or more | 1 × 10$^{15}$ or more | 1 × 10$^{15}$ or more | 5 × 10$^{11}$ | 1 × 10$^{15}$ or more |
| | Presence of display unevenness | — | A | C | C | A | B |

TABLE 2

| | | | Example 1 | Example 2 | Example 3 | Example 4 | Example 5 | Example 6 | Example 7 |
|---|---|---|---|---|---|---|---|---|---|
| Electrophoretic particles | Core particle | — | TiO$_2$ | TiO$_2$ | TiO$_2$ | TiO$_2$ | TiO$_2$ | TiO$_2$ | TiO$_2$ |
| | Carboxylic acid used for polarizing group | — | Formula (6) | Formula (7) | Formula (8) | Formula (9) | Formula (10) | Formula (11) | Formula (12) |
| | Occupancy rate of siloxane-based compound | % | 0.9 | 0.1 | 0.7 | 0.03 | 2.5 | 4.3 | 12.3 |
| | Siloxane bond-containing substance | — | Formula (1) | Formula (3) | Formula (4) | Formula (1) | Formula (1) | Formula (1) | Formula (1) |
| | Coupling agent | — | Formula (2) | Formula (2) | — | Formula (2) | Formula (2) | Formula (2) | Formula (2) |
| | Connected portion | — | 4-pentenoyl chloride | — | — | 4-pentenoyl chloride | 4-pentenoyl chloride | 4-pentenoyl chloride | 4-pentenoyl chloride |
| Dispersion liquid | Dispersion medium | — | Dimethyl silicone oil | | | | | | |
| | Dispersant | % by mass | — | — | — | — | — | — | — |
| Evaluation results | Dispersibility (reflectance) | — | A | A | A | B | A | A | A |
| | Zeta potential | mV | 25.1 | 0.5 | −1.4 | −0.8 | −8.2 | −28.1 | −3.7 |
| | Volume resistivity | Ω · m | 1 × 10$^{15}$ or more | 1 × 10$^{15}$ or more | 1 × 10$^{15}$ or more | 1 × 10$^{15}$ or more | 1 × 10$^{15}$ or more | 1 × 10$^{15}$ or more | 1 × 10$^{15}$ or more |

As is evident from Table 1, in the electrophoretic display device produced using the electrophoretic particles obtained in respective Reference Examples, balance between the dispersibility and the charging characteristics was achieved. Here, it is considered that the charging property of the electrophoretic particles obtained in respective Reference Examples were originated from the charging property of an exposed portion without being covered by the siloxane-based compound from the surface of the core particle.

In addition, the electrophoretic particles obtained in respective Examples were capable of exhibiting the same dispersibility as that of the electrophoretic particles obtained in respective Reference Examples. Further, all zeta potentials of the electrophoretic particles obtained in respective Examples are evidently different from the zeta potentials of the titanium oxide particles. Furthermore, as listed in Table 2, the electrophoretic particles obtained in Examples 1 to 7 have different zeta potentials from each other and a plus polarity and a minus polarity existed. Therefore, it is understood that the charging amount or the charging polarity of the electrophoretic particles can be controlled by the introducing amount and the kind of the polarizing group.

In addition, when the zeta potentials were measured after the electrophoretic particles were produced in the same manner as those of Examples 1 to 7 except that carbon black particles were used instead of the titanium oxide particles, the values were +15.3 mV, −2.5 mV, −6.5 mV, −4.8 mV, −12.1 mV, −30.6 mV, and −7.8 mV. From these results, it is understood that the charging amount or the charging polarity of the electrophoretic particles can be controlled by introduction of the polarizing group and the kind of the polarizing group regardless of the type of mother particles.

In contrast, in the electrophoretic display device produced using electrophoretic particles obtained in Comparative Example 4, the charging amount was substantially zero. Accordingly, in the electrophoretic particles obtained in Comparative Example 4, it is assumed that the substantially entire surface of the core particle is covered with a coupling agent, so the charging characteristics derived from the core particle were embedded.

In addition, in the electrophoretic display device produced using the electrophoretic particles obtained in Comparative Example 3, the dispersibility of the electrophoretic particles was slightly low. Further, the volume resistivity between electrodes was reduced by 4 or more digits when compared to the electrophoretic display device produced using the electrophoretic particles obtained in respective Examples, and the generated leakage current was relatively high. It is considered that the result was affected by the dispersant added to the electrophoretic dispersion liquid.

Further, in the electrophoretic particles obtained in Comparative Examples 1 and 2, the charging amount was small and the display unevenness was large.

Further, in the electrophoretic particles obtained in Comparative Example 5, the charging characteristic were excellent, but the dispersibility was degraded when compared to the electrophoretic particles obtained in respective Reference Examples and respective Examples.

The present invention contains subject matter related to Japanese Patent Application No. 2013-131987 filed in the Japanese Patent Office on Jun. 24, 2013 and Japanese Patent Application No. 2014-029023 filed in the Japanese Patent Office on Feb. 18, 2014, the entire contents of which are incorporated herein by reference.

What is claimed is:

1. An electrophoretic particle, comprising:
a mother particle;
a siloxane-based compound that is derived from silicone oil and is bonded to a surface of the mother particle and contains a connection structure in which a plurality of siloxane bonds are serially connected to each other; and
a polarizing group that is an organic group bonded to the surface of the mother particle, contains a main skeleton and a substituent bonded to the main skeleton, and has unevenly distributed electrons on the mother particle side of the main skeleton or the opposing side thereof,
wherein the main skeleton included in the polarizing group has a portion in which $\pi$ electrons are delocalized.

2. The electrophoretic particle according to claim 1, wherein an occupancy rate of an area to which the siloxane-based compound is bonded on the surface of the mother particle is in a range of 0.05% to 20%.

3. The electrophoretic particle according to claim 1, wherein the total content of the siloxane-based compound and the polarizing group is in a range of 0.5 parts by mass to 10 parts by mass based on 100 parts by mass of the mother particle.

4. The electrophoretic particle according to claim 1, wherein an occupancy rate of the area to which the polarizing group is bonded on the surface of the mother particle is lower than that of an area to which the siloxane-based compound is bonded on the surface of the mother particle.

5. The electrophoretic particle according to claim 1, wherein the siloxane-based compound has a linear molecular structure that is formed of a main chain containing the connection structure and a side chain bonded to the main chain.

6. The electrophoretic particle according to claim 1,
wherein the siloxane-based compound has a structure derived from a coupling agent which is bonded to the surface of the mother particle, and
the connection structure is connected to the surface of the mother particle through the structure derived from the coupling agent.

7. The electrophoretic particle according to claim 1,
wherein the siloxane-based compound has a hydrocarbon structure bonded to the surface of the mother particle, and
the connection structure is connected to the surface of the mother particle through the hydrocarbon structure.

8. The electrophoretic particle according to claim 1, wherein a weight average molecular weight of the siloxane-based compound is in the range of 1000 to 100000.

9. The electrophoretic particle according to claim 1, wherein a molecular weight of the polarizing group is smaller than the molecular weight of the siloxane-based compound.

10. The electrophoretic particle according to claim 1, wherein the portion in which $\pi$ electrons are delocalized includes a cyclic structure having a cyclic shape in at least a portion thereof.

11. The electrophoretic particle according to claim 10,
wherein the cyclic structure is positioned on an end portion of the main skeleton, which is the opposite side to the mother particle, and
the substituent is bonded to the cyclic structure.

12. The electrophoretic particle according to claim 11, wherein the substituent is an electron attracting group or an electron donating group.

13. The electrophoretic particle according to claim 10, wherein the main skeleton has a portion functioning as a spacer which is positioned between the mother particle and the cyclic structure.

14. The electrophoretic particle according to claim 10,
wherein the polarizing group includes a structure derived from the coupling agent which is bonded to the surface of the mother particle, and
the cyclic structure is connected to the surface of the mother particle through the structure derived from the coupling agent.

15. An electrophoretic dispersion liquid, comprising:
a plurality of the electrophoretic particles according to claim 1; and
a dispersion medium that allows the plurality of electrophoretic particles to be dispersed.

16. The electrophoretic dispersion liquid according to claim 15, wherein the relative dielectric constant of the dispersion medium is in the range of 1.5 to 3.

17. A display sheet, comprising:
a first substrate on which a first electrode is provided;
a second substrate that is arranged to face the first substrate and on which a second electrode is provided; and
a display layer that is provided between the first substrate and the second substrate and contains the electrophoretic dispersion liquid according to claim 15.

18. A display device, comprising the display sheet according to claim 17.

19. Electronic equipment, comprising the display device according to claim 18.

* * * * *